(12) United States Patent
Kodama

(10) Patent No.: US 8,908,087 B2
(45) Date of Patent: Dec. 9, 2014

(54) MULTIBAND CAMERA, AND MULTIBAND IMAGE CAPTURING METHOD

(75) Inventor: Kenichi Kodama, Mito (JP)

(73) Assignee: Nikon Corporation, Tokyo (JP)

( * ) Notice: Subject to any disclaimer, the term of this patent is extended or adjusted under 35 U.S.C. 154(b) by 17 days.

(21) Appl. No.: 13/885,684

(22) PCT Filed: Nov. 7, 2011

(86) PCT No.: PCT/JP2011/006180
§ 371 (c)(1),
(2), (4) Date: May 15, 2013

(87) PCT Pub. No.: WO2012/066741
PCT Pub. Date: May 24, 2012

(65) Prior Publication Data
US 2013/0235256 A1    Sep. 12, 2013

(30) Foreign Application Priority Data
Nov. 16, 2010    (JP) .................. 2010-255641

(51) Int. Cl.
| | |
|---|---|
| *H04N 5/225* | (2006.01) |
| *G01J 3/28* | (2006.01) |
| *G01J 3/02* | (2006.01) |
| *G02B 27/10* | (2006.01) |
| *G03B 11/00* | (2006.01) |
| *G01J 3/36* | (2006.01) |
| *H04N 9/04* | (2006.01) |
| *G02B 27/12* | (2006.01) |
| *G03B 17/02* | (2006.01) |
| *G01J 3/12* | (2006.01) |

(52) U.S. Cl.
CPC ............ *H04N 5/2254* (2013.01); *G01J 3/2823* (2013.01); *G01J 3/2803* (2013.01); *G01J 3/0208* (2013.01); *G01J 2003/1213* (2013.01); *G02B 27/1013* (2013.01); *G03B 11/00* (2013.01); *G01J 3/36* (2013.01); *H04N 9/045* (2013.01); *G02B 27/123* (2013.01); *G03B 17/02* (2013.01)

USPC .......................................................... 348/360

(58) Field of Classification Search
USPC .......................................................... 348/360
See application file for complete search history.

(56) References Cited

U.S. PATENT DOCUMENTS 7,433,042 B1    10/2008    Cavanaugh et al.

OTHER PUBLICATIONS

International Search Report issued Jan. 24, 2012, in International Application No. PCT/JP2011/006180.

*Primary Examiner* — Roberto Velez
*Assistant Examiner* — Stephen Coleman
(74) *Attorney, Agent, or Firm* — Miles & Stockbridge P.C.

(57) ABSTRACT

A multiband camera comprises: a band-pass filter having four or more optical filters; a microlens array having arrayed microlenses; a photoelectric conversion element including a plurality of pixels; and a measurement unit for measuring spectral intensity. The multiband camera satisfies the expression below, where Pl is a pitch between the microlenses, Ps is a pitch between the pixels, n is a number of pixels corresponding to one microlens, u is an effective dimension in a prescribed direction of the pixels, t is a dimension in the prescribed direction of a real image that the band-pass filter forms on a plurality of two-dimensionally arrayed pixels, Na is a number of microlenses arrayed in the prescribed direction, L is a distance from an exit pupil to the microlens, and f is a focal length of the microlens.

$$\left(1-\frac{f}{L}\right)nPs - \frac{3Ps-u-t}{Na} \le \quad \text{[Expression 14]}$$

$$Pl \le \left(1-\frac{f}{L}\right)nPs + \frac{3Ps-u-t}{Na}$$

15 Claims, 25 Drawing Sheets

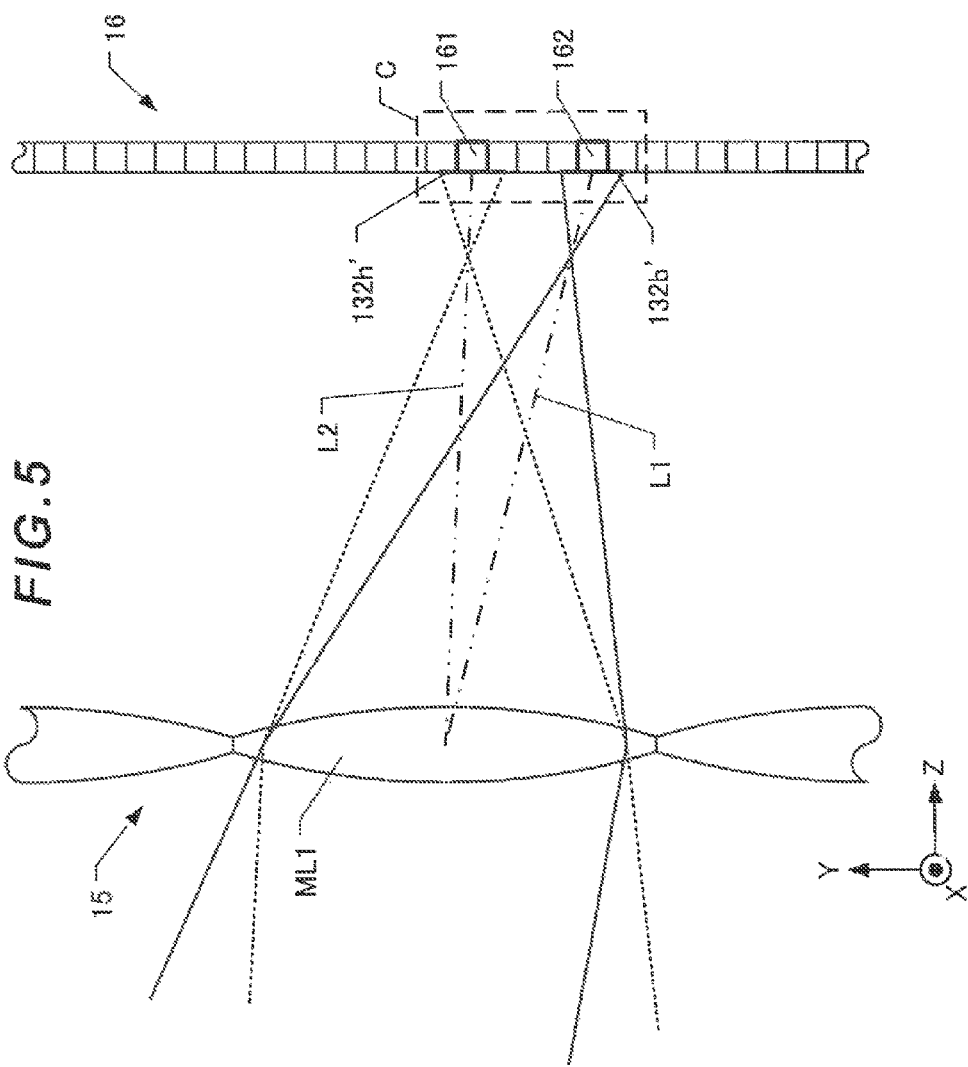

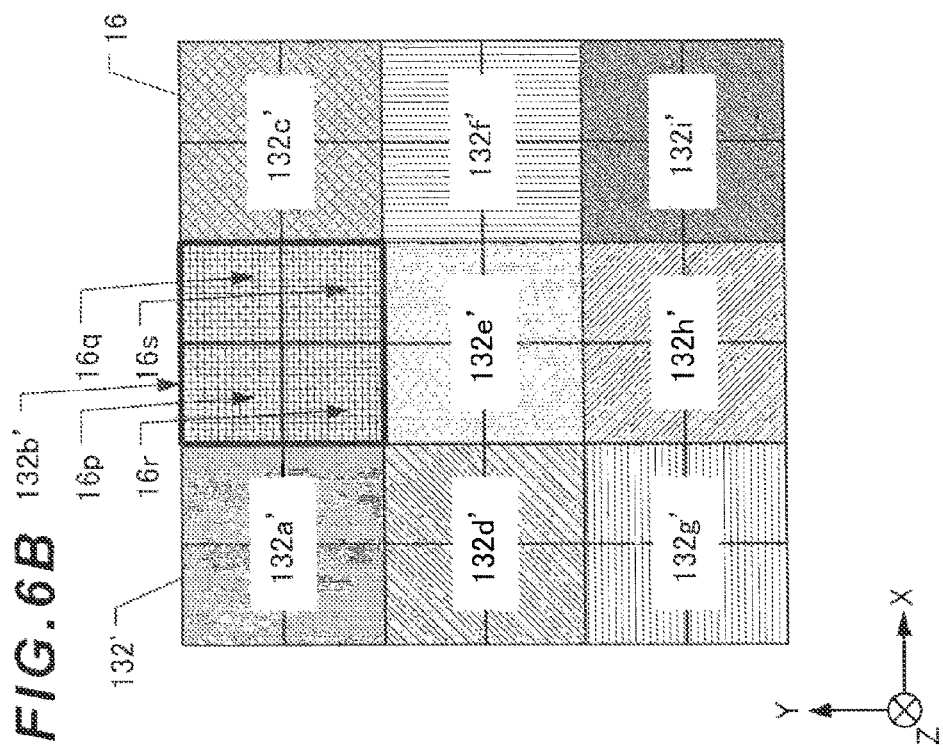
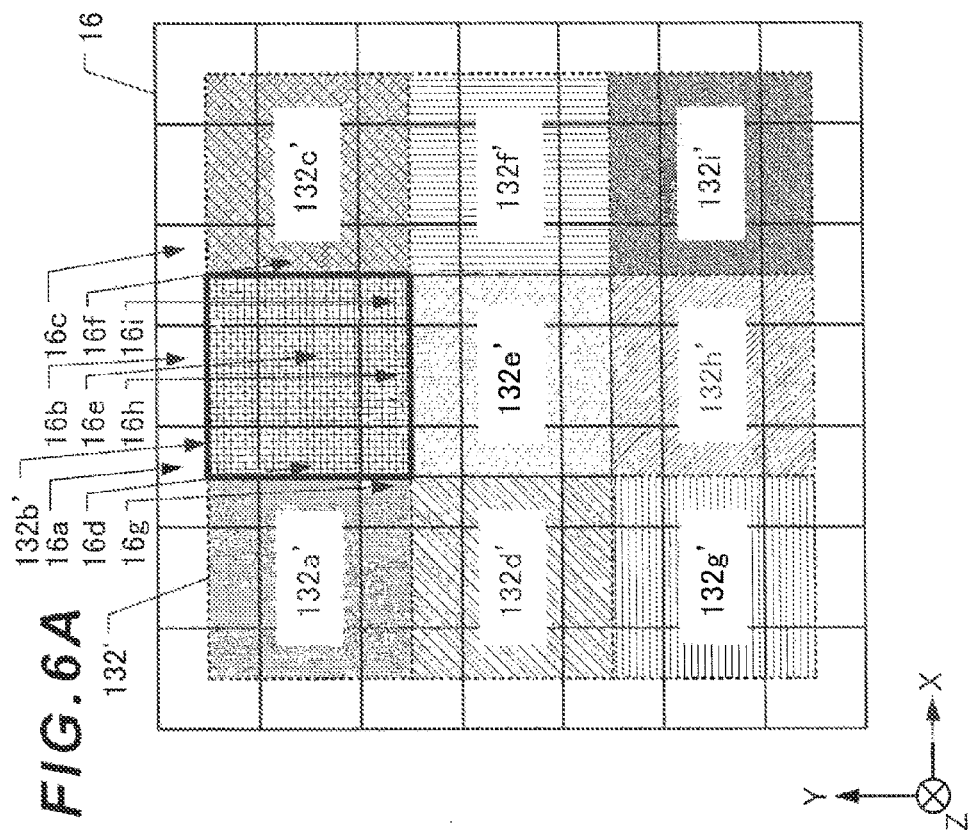

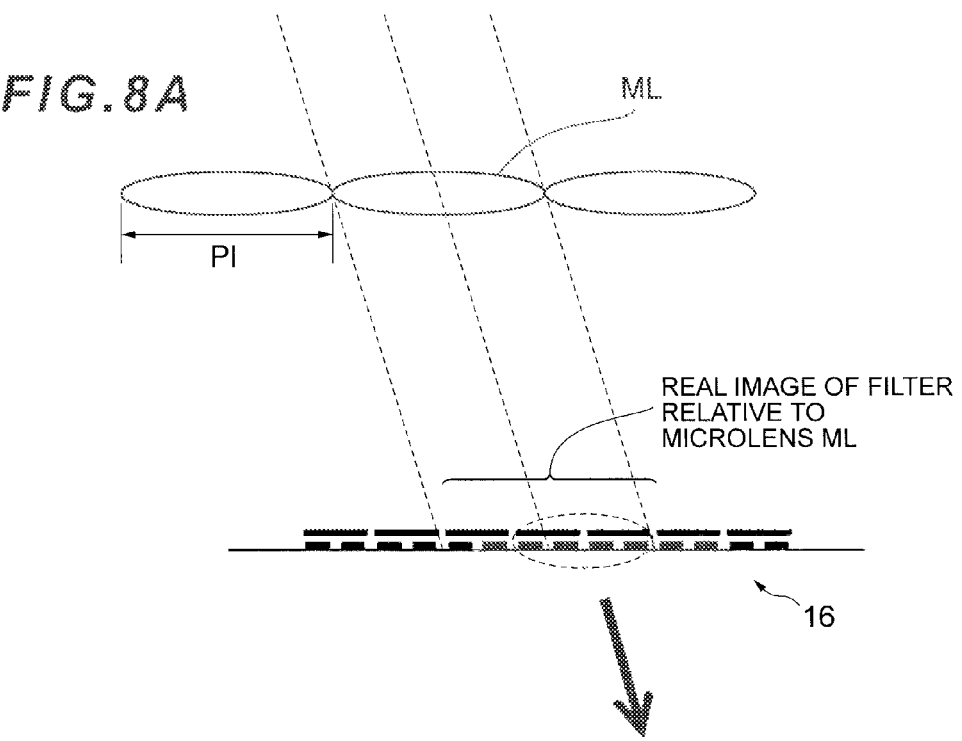
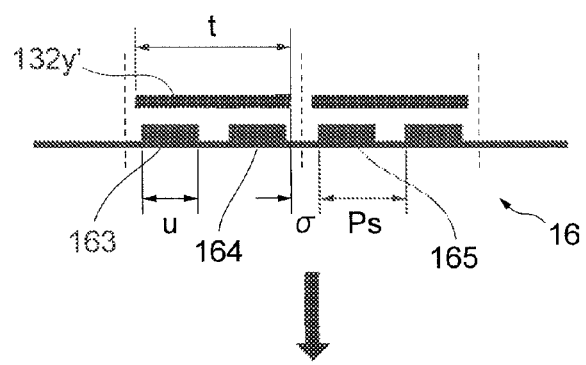
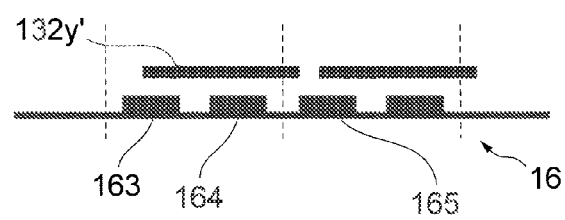

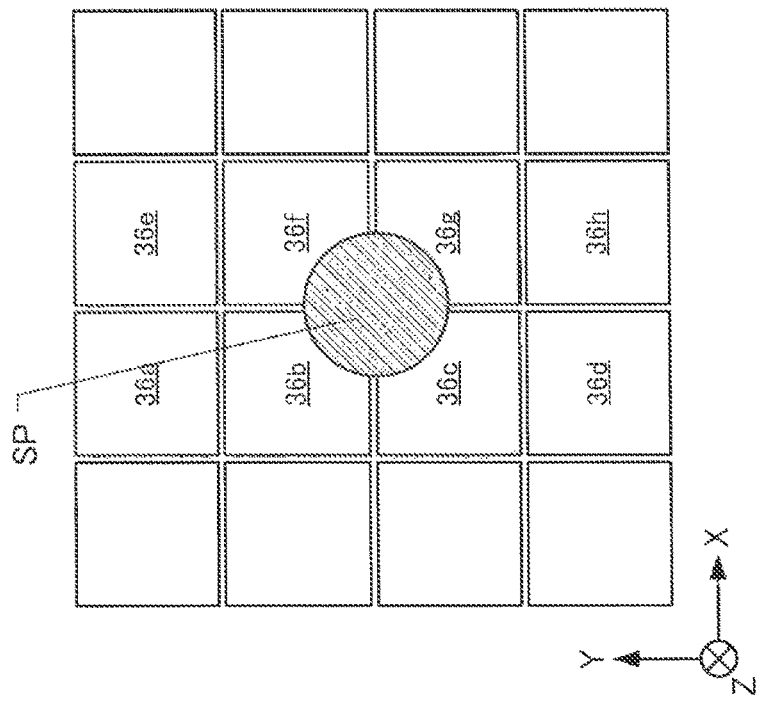
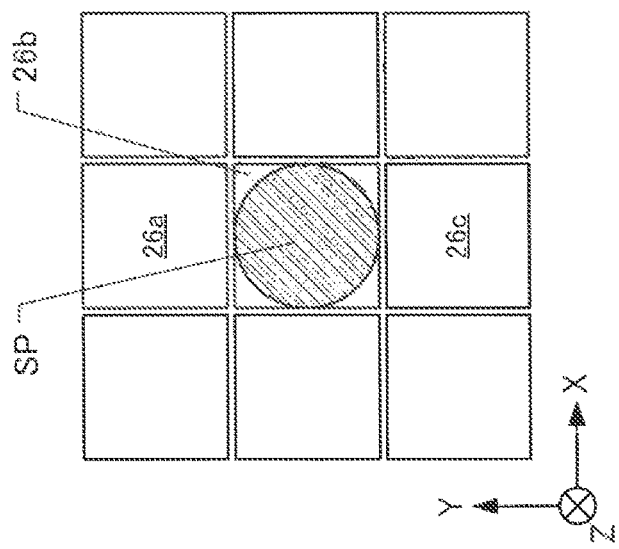

MULTIBAND CAMERA, AND MULTIBAND IMAGE CAPTURING METHOD

TECHNICAL FIELD

The present invention relates to a multiband camera and a multiband image capturing method for obtaining a multiband two-dimensional spectral image in one shot of image capturing.

TECHNICAL BACKGROUND

An example of a method for obtaining a two-dimensional spectral image is disclosed in Patent Document 1. In Patent Document 1, a multiband image is captured using a multiband camera including an object lens, a color filter array divided into a plurality of image capturing wavelength regions, a microlens array including a plurality of microlenses, and a two-dimensional detector for capturing an image for each spectrum divided by the color filter array.

Example 1 in Patent Document 1 illustrates a multiband camera in which the color filter array is disposed between the microlens array and the two-dimensional detector. Example 2 discloses a multiband camera in which the color filter array is disposed in the neighborhood of the object lens at a distance from the microlens array.

PRIOR ARTS LIST

Patent Document

Patent Document 1: U.S. Pat. No. 7,433,042 B1

SUMMARY OF THE INVENTION

Problems to be Solved by the Invention

However, in Example 2 in Patent Document 1, it is stated that it is difficult to align the color filter array with the optical system of a multiband camera in which the color filter array is disposed not directly in front of the detector array but in the neighborhood of the object lens.

An object of the present invention is to provide a multiband camera and a multiband image capturing method that can be implemented even in a case in which a band-pass filter is disposed inside an imaging optical system.

Means to Solve the Problems

A multiband camera of a first aspect is used for capturing an image of an image capture wavelength region in mutually different wavelength bands divided into four or more bands when capturing an image of a subject. The multiband camera comprises: a band-pass filter that is disposed in a position of a pupil of an optical system and has four or more optical filters for respectively transmitting the wavelength bands divided into four or more bands; a microlens array having two-dimensionally arrayed positive microlenses; a photoelectric conversion element that is disposed in the vicinity of a focal point of the microlens array and is disposed in or proximal to a conjugate position with the band-pass filter, and includes a plurality of two-dimensionally arrayed pixels on which is incident a flux of light transmitted through the band-pass filter and guided by the microlens array; and a measurement unit for measuring a spectral intensity of the flux of light from the subject based on a signal output from the pixels corresponding to the optical filters. Here, the expression below is satisfied, where Pl is a pitch in a prescribed direction between the microlenses of the microlens array, Ps is a pitch in the prescribed direction between the pixels of the photoelectric conversion element, n is a number of pixels in the prescribed direction corresponding to one of the microlenses, u is an effective dimension in a prescribed direction of the pixels, t is a dimension in a prescribed direction of a real image of the band-pass filter formed on the plurality of two-dimensionally arrayed pixels, Na is a number of microlenses arrayed in a prescribed direction, L is a distance from an exit pupil to the microlens, and f (<<L) is a focal length of the microlens.

$$\left(1 - \frac{f}{L}\right)nPs - \frac{3Ps - u - t}{Na} \leq$$

$$Pl \leq \left(1 - \frac{f}{L}\right)nPs + \frac{3Ps - u - t}{Na}$$

[Expression 1]

A multiband image capturing method of a second aspect is used for capturing an image of a subject with a photoelectric conversion element including two-dimensionally arrayed pixels by way of a band-pass filter being disposed in a position of a pupil of an optical system and having optical filters corresponding to wavelength bands divided into four or more bands and by way of a microlens array for guiding a flux of light transmitted through the band-pass filter. The multiband image capturing method comprises: a preparation step for preparing the microlens array having the microlenses satisfying the expression below; a sensitivity correction step for correcting a sensitivity for each of the pixels of the photoelectric conversion element; an image capturing step for capturing an image of the subject with the photoelectric conversion element by way of the band-pass filter and the microlens array; and a measurement step for measuring a spectral intensity of each of the divided wavelength bands based on a signal output upon image capturing being performed in the image capturing step.

$$\left(1 - \frac{f}{L}\right)nPs - \frac{3Ps - u - t}{Na} \leq$$

$$Pl \leq \left(1 - \frac{f}{L}\right)nPs + \frac{3Ps - u - t}{Na}$$

[Expression 2]

where Pl indicates a pitch in a prescribed direction between the microlenses of the microlens array; Ps indicates a pitch in the prescribed direction between the pixels of the photoelectric conversion element; n indicates a number of pixels in the prescribed direction corresponding to one of the microlenses; u indicates an effective dimension in a prescribed direction of the pixels; t indicates a dimension in a prescribed direction of a real image of the band-pass filter formed on the plurality of two-dimensionally arrayed pixels; Na indicates a number of microlenses arrayed in a prescribed direction; L indicates a distance from an exit pupil to the microlens; and f indicates a focal length of the microlens.

Advantageous Effects of the Invention

The present invention is a multiband camera and a multiband image capturing method with which a multiband two-dimensional spectral image can be obtained in one shot of image capturing.

BRIEF DESCRIPTION OF THE DRAWINGS

FIG. 5 is an enlarged view of the portion outlined by the discontinuous line C in FIG. 4;

FIG. 6 is an explanatory diagram illustrating the relationship between the pixels 16 of the photoelectric conversion element 17 and a real image 132' on the band-pass filter array 132 viewed from the microlens array 15;

FIG. 5A illustrates the positional relationships between the microlenses ML and pixels 16 as well as real images of the band-pass filters formed thereon, FIG. 8B illustrates the case in which pitch alignment and positional alignment between the microlenses ML and the pixels 16 were performed correctly, and FIG. 8C illustrates the case in which a shift has occurred in pitch alignment between the microlenses ML and the pixels 16;

FIG. 10A illustrates positional alignment between the microlens array 15 and the photoelectric conversion element 17 in the case in which the number of pixels 16 in the Y axis direction relative to one microlens ML is odd, and FIG. 10B illustrates positional alignment between the microlens array 15 and the photoelectric conversion element 17 in the case in which the number of pixels 16 in the Y axis direction relative to one microlens ML is even;

DESCRIPTION OF THE EMBODIMENTS

Embodiment 1

<Configuration of the Image Capturing Unit 50>

Figure 1:
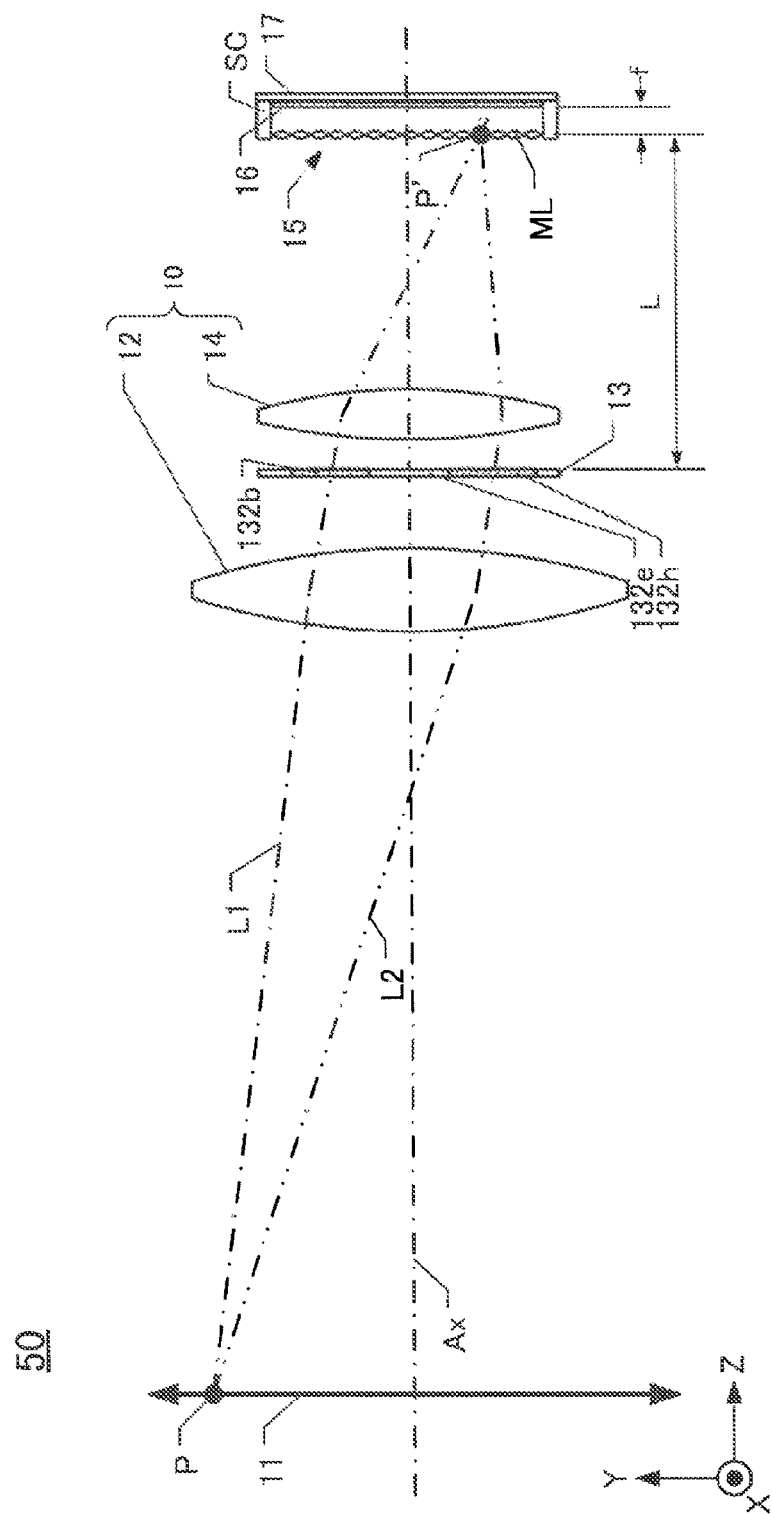
FIG. 1 is a schematic diagram of the image capturing unit 50 of Embodiment 1.
Figure 2:
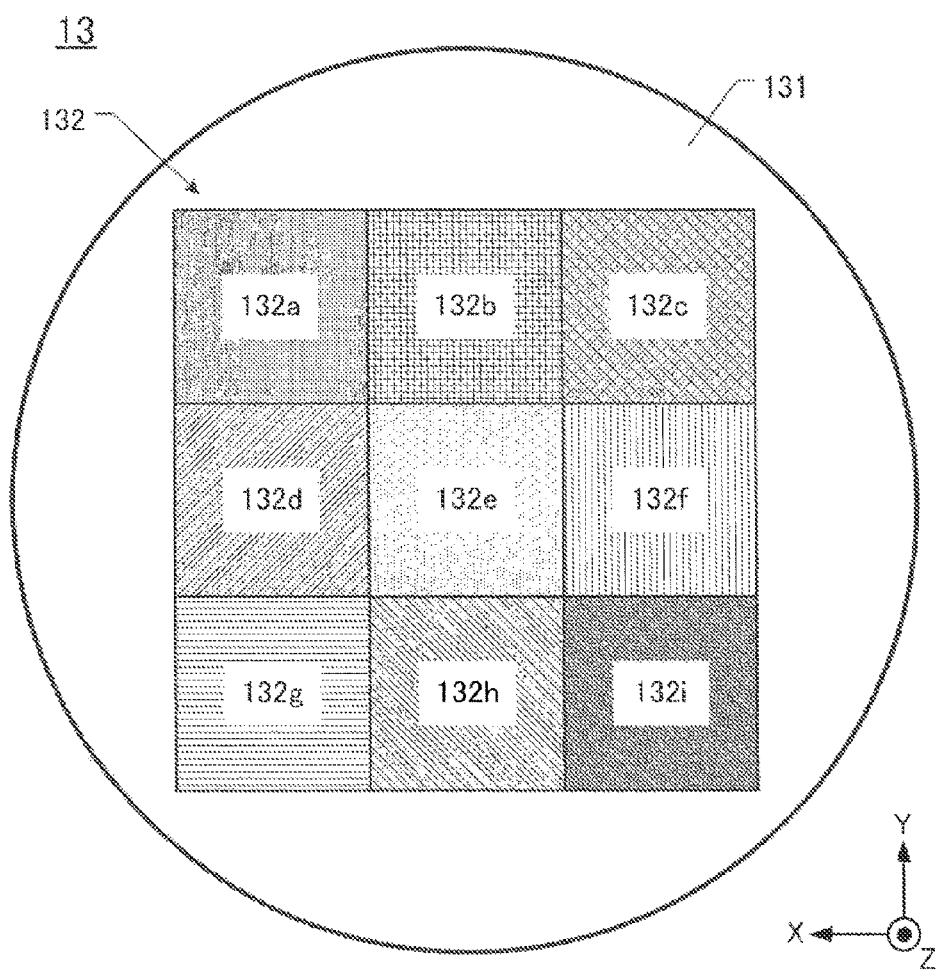
FIG. 2 is a plan view of the band-pass filter unit 13.

The configuration of an image capturing unit 50 is described while referring to FIGS. 1 and 2. In Embodiment 1, the description is given with the direction of the optical axis Ax as the Z axis direction and the plane perpendicular to the Z axis direction as the XY plane. The same coordinate system is used also in the subsequent modification and Embodiment 2.

FIG. 1 is a schematic diagram of the image capturing unit 50 of Embodiment 1. Although a subject 11 is drawn in FIG. 1 for ease of understanding, the subject is not an accessory to the image capturing unit 50. As illustrated in FIG. 1, the image capturing unit 50 has an imaging optical system 10 including two lenses 12 and 14 placed along the optical axis Ax. Here, the focal length of the imaging optical system 10 is, for example, 5 mm to hundreds of millimeters in the case of a camera lens, and the lenses 12 and 14 are lens groups including a plurality of lenses. A band-pass filter unit 13 is disposed in the position of a pupil between the lenses 12 and 14. The focus of the imaging optical system 10 can thereby be adjusted by moving only the lens 12 closer to the subject 11 along the optical axis Ax. That is, adjustment is performed so that a real image of the subject 11 is formed on a microlens array 15 to be described. At this time, because the lens 14 does not move, the relative relationships among the band-pass filter unit 13, the lens 14, and the microlens array 15 does not change at all.

The image capturing unit 50 has a microlens array 15 that is disposed toward the +Z side of the imaging optical system 10 and in a conjugate position with the subject 11. The microlens array 15 is configured with tens of thousands to millions of positive microlenses ML on the XY plane. Each microlens ML is, for example, circular, quadrangular, or hexagonal, and the focal length thereof is tens to hundreds of microns.

The image capturing unit 50 has a photoelectric conversion element 17 toward the +Z side of the microlens array 15 and in or proximal to a conjugate position with the band-pass filter unit 13. The photoelectric conversion element 17 is configured with hundreds of thousands to tens of millions of pixels 16. The photoelectric conversion element 17 is, for example, a two-dimensional charge-coupled device (CCD) image sensor or a two-dimensional CMOS image sensor. For example, each pixel 16 has a shape similar to the band-pass filters 132a to 132i.

FIG. 2 is a plan view of the band-pass filter unit 13 viewed from the Z axis direction. As illustrated in FIG. 2, the circular band-pass filter unit 13 has a rectangular band-pass filter array 132 disposed in the center and a light-blocking unit 131 on the periphery thereof.

The band-pass filter array 132 is configured with nine rectangular band-pass filters 132a to 132i disposed in a 3×3 form. For example, the band-pass filter 132a transmits light of the 390 nm to 430 nm wavelength region, and the band-pass filter 132b transmits light of the 430 nm to 470 nm wavelength region. Likewise, the band-pass filter 132c transmits light of 470 nm to 510 nm, the band-pass filter 132d transmits light of 510 nm to 550 nm, the band-pass filter 132e transmits light of 550 nm to 590 nm, the band-pass filter 132f transmits light of 590 nm to 630 nm, the band-pass filter 132g transmits light of 630 nm to 670 nm, and the band-pass filter 132h transmits light of 670 nm to 710 nm. The band-pass filter 132i transmits light of the 710 nm to 750 nm wavelength region. That is, the entire band-pass filter array 132 transmits light of the 390 nm to 750 nm wavelength region divided into 9 bands.

The light-blocking unit 131 is, for example, chrome plated, and blocks light from the subject 11 (see FIG. 1). Light from the subject 11 (see FIG. 1) being incident on the photoelectric conversion element 17 (see FIG. 1) without being transmitted through the band-pass filter array 132 can be blocked thereby.

Although the band-pass filter array 132 is configured with nine band-pass filters in a 3×3 array in the present specification, the present invention is not limited to this; the band-pass filter array may be configured with four band-pass filters in a 2×2 array or with sixteen band-pass filters in a 4×4 array. The wavelength region of the band-pass filter array 132 is not limited to the visible light region (390 nm to 750 nm), and may include the ultraviolet region or infrared region.

Figure 3A:
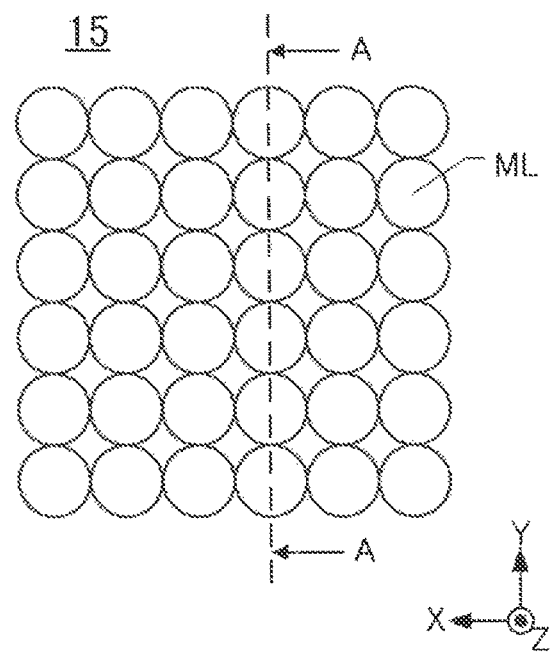
FIG. 3A is a plan view illustrating the microlens array 15 of Embodiment 1.
Figure 3B:
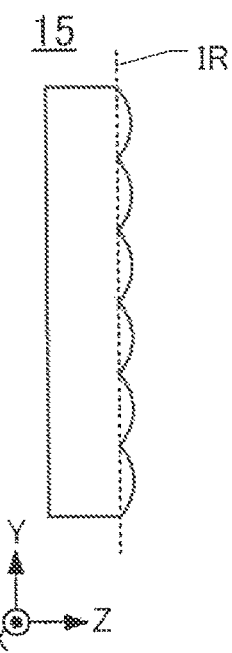
FIG. 3B is a sectional view along A-A in FIG. 3A.

FIG. 3A is a plan view illustrating a portion of the microlens array 15 of Embodiment 1, and FIG. 3B is a sectional view along A-A in FIG. 3A. As illustrated in FIG. 3A, the microlens array 15 is configured with a plurality of circular microlenses ML arrayed in a straight line along the X axis and Y axis directions. As illustrated in FIG. 3B, each microlens ML has a prescribed width, the side on which the light is incident is formed as a plane, and the side from which the light exits is formed as an arc. Here, an image resolution plane IR of the subject 11 is formed on the microlens ML.

As illustrated in FIG. 1 to be described, the image capturing unit 50 has a pair of spacers SC that are disposed between the microlens array 15 and the photoelectric conversion element 17 and determine a distance in the Z direction between the microlens array 15 and the photoelectric conversion element 17. The spacers SC are to be described in detail using FIG. 9.

<Optical Path Inside the Image Capturing Unit 50>

Figure 4:
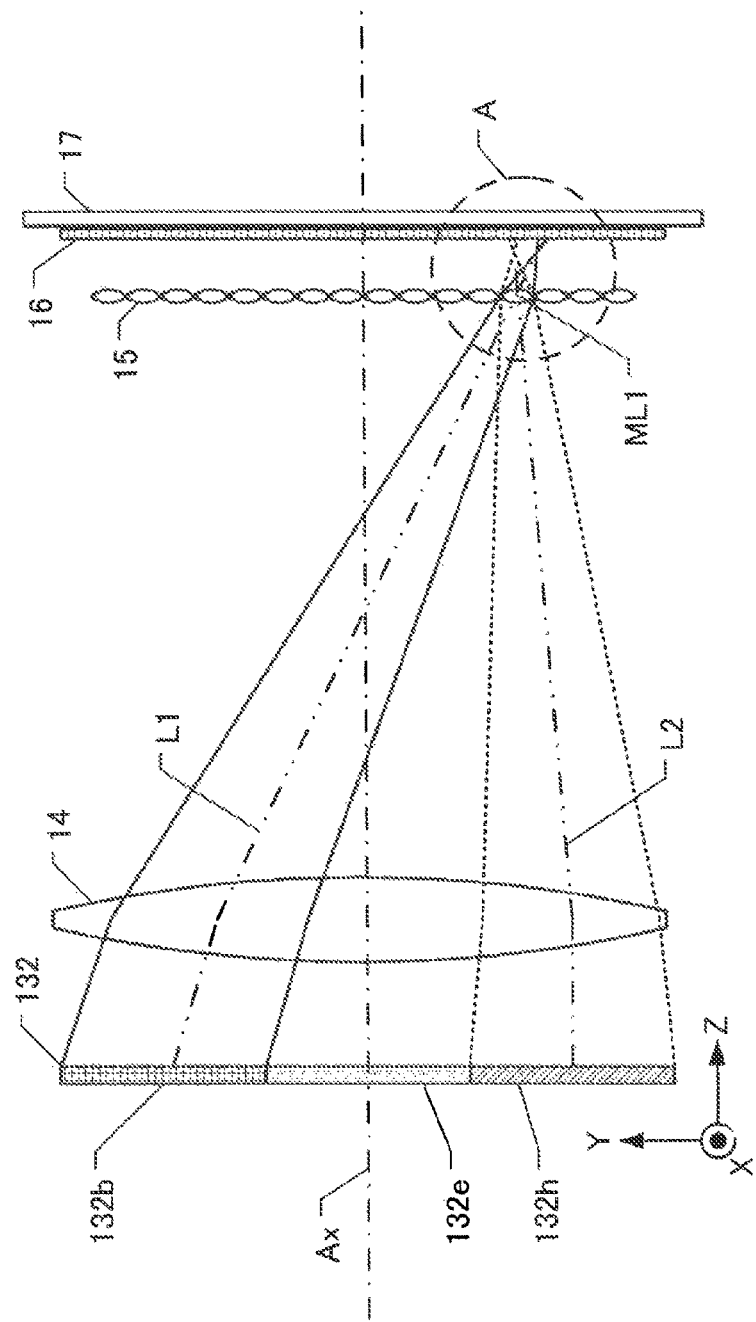
FIG. 4 is an explanatory diagram illustrating the relationships among the band-pass filter array 132, the microlens array 15, and the pixels 16 of the photoelectric conversion element 17.

The optical path inside the image capturing unit 50 is described with an example of fluxes of light L1 and L2 from a certain point P on the subject 11 illustrated in FIGS. 1, 4, and 5. Only the main light beams of the fluxes of light L1 and L2 are depicted for ease of understanding.

As illustrated in FIG. 1, the fluxes of light L1 and L2 from the point P on the subject 11 are refracted by the lens 12 of the imaging optical system 10 and are incident on the band-pass filter unit 13. For example, the flux of light L1 is transmitted through the band-pass filter 132b (see FIG. 2) of the band-pass filter unit 13, and the flux of light L2 is transmitted through the band-pass filter 132h (see FIG. 2) of the band-pass filter unit 13. That is, only the light of the 430 nm to 470 nm wavelength region contained in the flux of light L1 is transmitted through the band-pass filter unit 13. Likewise, only the light of the 670 nm to 710 nm wavelength band contained in the flux of light L2 is transmitted through the band-pass filter unit 13.

The fluxes of light L1 and L2 transmitted through the band-pass filter unit 13 are refracted by the lens 14 of the imaging optical system 10, and are incident on the microlens array 15. Here, because the microlens array 15 is disposed in a conjugate position with the subject 11, the real image of the subject 11 is formed on the microlens array 15. The focal point of the imaging optical system 10 can be adjusted by moving only the lens 12 closer to the subject 11 along the optical axis Ax. Therefore, the fluxes of light L1 and L2 from the same point P are incident on the same microlens ML1 (see FIG. 4) of the microlens array 15.

FIG. 4 is an explanatory diagram illustrating the relationships among the band-pass filter array 132 of the band-pass filter unit 13, the microlens array 15, and the pixels 16 of the photoelectric conversion element 17. FIG. 5 is an enlarged view of the portion outlined by the discontinuous line A in FIG. 4. As illustrated in FIGS. 4 and 5, the pixels 16 of the photoelectric conversion element 17 are positioned in or proximal to a conjugate position with the band-pass filter. Here, because the focal length of the microlens ML1 is far shorter than the focal length of the lens 14, the position conjugate with the band-pass filters 132b and 132h is in the neighborhood of the focal point of the microlens ML1.

Because the pixels 16 of the photoelectric conversion element 17 are disposed in or proximal to the focal plane of the microlenses ML, real images 132b' and 132h' are formed on the pixels 16 of the photoelectric conversion element 17.

As illustrated in FIG. 5, the fluxes of light L1 and L2 are collected in the respectively different positions of the pixels 161 and 162. However, the real image of the band-pass filter unit 13 is not limited to being collected on one pixel; it may also be collected on a plurality of pixels, depending on the size of the band-pass filter array 132, the magnification factor of the microlens ML, or the like.

FIGS. 6A and B are diagrams for describing the relationship between the pixels 16 and the real image 132' of the band-pass filter array 132 viewed from the side of the microlens array 15. The difference between FIGS. 6A and B is that the region of the pixels 16 on which the real image 132' is formed differs according to the size of the band-pass filter array 132 and the imaging magnification of the real image 132' by the lens 14 and the microlens ML.

In FIG. 6A, the real image 132' is formed in a 7×7 region of 49 pixels. As illustrated in FIG. 6A, for example, the rectangular real image 132b' indicated by the bold lines is formed in nine pixels (3×3) including pixels 16a to 16i. Here, only the flux of light L1 transmitted through the band-pass filter 132b is imaged on the pixel 16e. Meanwhile, for example, real images 132a' and 132b' from fluxes of light transmitted through two band-pass filters 132a and 132b are formed on the pixel 16a, and, for example, real images 132b', 132c', 132e', and 132f' from fluxes of light transmitted through four band-pass filters 132b, 132c, 132e, and 132f are formed on the pixel 16i.

Therefore, when obtaining the wavelength characteristics of the subject 11, for example, the characteristics of the flux of light L1 transmitted through the band-pass filter 132b are obtained with the pixel 16e on which is incident only the flux of light L1 transmitted through the band-pass filter 132b. Likewise in the case of the real images 132a' and 132c' to 132i' of the other eight band-pass filters, the wavelength characteristics of the fluxes of light are obtained using the pixel 16 in the middle of the nine pixels (3×3).

In FIG. 6B, the real image 132' is formed in a 6×6 region of 36 pixels. As illustrated in FIG. 6B, the real image 132b' of the band-pass filter 132b is formed on four pixels including the pixels 16p to 16s. At this time, for example, when obtaining the characteristics of the flux of light L1 transmitted through the band-pass filter 132b, any one of the four pixels 16p to 16s may be used, or all of the outputs may be combined. Likewise, the real images 132a' and 132c' to 132i' of the other eight band-pass filters also are formed on regions of four pixels 16. Therefore, the respective pixels 16 are used when obtaining the wavelength characteristics of each flux of light.

<Pitch Relationship Between Microlenses ML and Pixels 16>

In order for a flux of light transmitted through the band-pass filter array 132 to be utilized efficiently, the pixels 16 of the photoelectric conversion element 17 and the image of the band-pass filters 132a to 132i formed thereon should match correctly as illustrated in FIG. 6B. Therefore, not only is the position of the X and Y directions between the microlens array 13 and the photoelectric conversion element 17 aligned, but also the pitch between the two is corrected relatively. Such pitch relationship is described while referring to FIG. 7.

Figure 7:
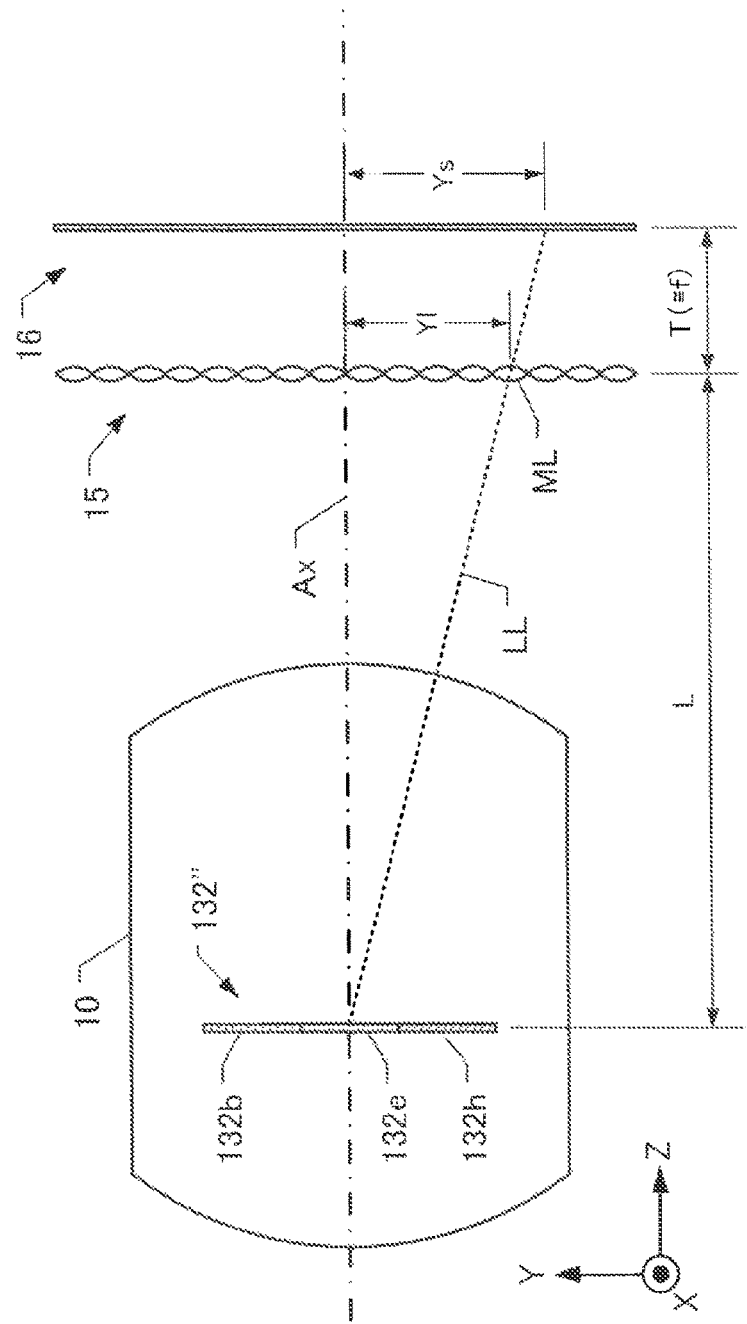
FIG. 7 is an explanatory diagram for describing the pitch relationship between the microlenses ML of the microlens array 15 and the pixels 16 of the photoelectric conversion element 17.

FIG. 7 is an explanatory diagram for describing the pitch relationship between the microlenses ML of the microlens array 15 and the pixels 16 of the photoelectric conversion element 17. In FIG. 7, Yl is the distance from the center of the optical axis Ax to the center of the microlenses ML. A flux of light LL exiting from a point on the optical axis Ax of a virtual image 132″ appearing in the position of the exit pupil of the band-pass filter array 132 is next considered. At this time, Ys is the distance from the optical axis Ax to a point on the pixels 16 of the photoelectric conversion element 17 where the flux of light LL arrives on being transmitted through the center of the microlenses ML. L is the distance from the virtual image 132″ of the band-pass filter array (exit pupil of the imaging optical system 10) to the microlens array 15. T is the distance between the microlens array 15 and the photoelectric conversion element 17, and f is the focal length of the microlenses ML.

As illustrated in FIG. 7, the image side is a non-telecentric optical system. Because the image side is non-telecentric, the flux of light LL transmitted through the band-pass filter array 132 and transmitted through the center of the microlenses L arrives on the pixels 16 of the photoelectric conversion element 17 while spreading outward. Here, expression (1) below is obtained by the fundamental formula of imaging.

[Expression 3]

$$\frac{1}{L} + \frac{1}{T} = \frac{1}{f} \tag{1}$$

The left side of expression (2) is obtained when expression (1) is solved for T.

[Expression 4]

$$T = \frac{Lf}{L-f} \cong f \tag{2}$$

Because f≪L in expression (2), the distance T between the microlens array 15 and the photoelectric conversion element 17 becomes nearly equal to the focal length f of the microlenses ML, and is as indicated on the right side of expression (2). In other words, the real image of the band-pass filter array 132 is formed at a position of nearly the focal length f from the microlens array 15.

Yl and Ys satisfy expression (3) by the geometric relationship illustrated in FIG. 7.

[Expression 5]

$$Yl = \frac{L}{L+T} Ys \tag{3}$$

Expression (4) is obtained when the left side of expression (2) is inserted into expression (3).

[Expression 6]

$$Yl \left(1 - \frac{f}{L}\right) Ys \tag{4}$$

Because the relationship of expression (4) is established for all microlenses ML of the microlens array 15, expression (5) below is obtained.

[Expression 7]

$$Pl\left(1 - \frac{f}{L}\right) nPs \tag{5}$$

In expression (5), Pl is the microlens pitch of the microlens array 15, Ps is the pixel pitch of the photoelectric conversion element 17, and n is the number of pixels 16 in a one-dimensional direction (X or Y axis direction) corresponding to one microlens ML. In other words, the microlens pitch Pl and the pixel pitch Ps must satisfy expression (5).

In the case in which the image side is a non-telecentric optical system as described above, the microlens pitch Pl of the microlens array 15 is preferably set to the smaller side.

On the other hand, in the case in which the image side is a telecentric optical system, it should be considered that L→∞, and expression (6) below is obtained from expression (5).

[Expression 8]

$$\lim_{L \to \infty} Pl = nPs \tag{6}$$

As is clear from expression (6), the microlens pitch Pl of the microlens array 15 is desirably set so as to satisfy expression (7) below.

$$Pl = nPs \tag{7}$$

The pitch relationship between microlenses ML of the microlens array 15 and pixels 16 of the photoelectric conversion element 17 is as described above. However, errors may occur in actual pitch alignment. A method for ensuring that there is no influence on measurement of spectral characteristics, even in the case in which an error has occurred in pitch alignment between microlenses ML and pixels 16, is described below while referring to FIGS. 8A to C. FIG. 8A illustrates the positional relationships between the microlenses ML and pixels 16 as well as real images of each band-pass filter formed thereon. Here, the case in which two pixels (163, 164) correspond to a real image (132y′) of one band-pass filter is given as an example. FIG. 8B illustrates the case in which pitch alignment between the microlenses ML and the pixels 16 was performed correctly. FIG. 8C illustrates the case in which a shift has occurred in pitch alignment between the microlenses ML and the pixels 16.

When pitch alignment between the microlenses ML and the pixels 16 is performed correctly, the real image 132y′ of the band-pass filter is formed in the regular position above two pixels 163 and 164 as illustrated in FIG. 8E. However, when a shift occurs in pitch alignment between the microlenses ML and the pixels 16, the real image 132y′ of the band-pass filter comes to lie over the adjacent pixel 165 as illustrated in FIG. 8C. When this occurs, interference between band-pass filters arises, and the spectral characteristics may not be correctly measurable.

In order to deal with such circumstances, pitch alignment between the microlenses ML of the microlens array 15 and the pixels 16 of the photoelectric conversion element 17 must be performed with advance consideration of shift. Expression (8) below is obtained as illustrated in FIG. 8B, where σ is the distance in a prescribed direction from the real image 132y' of the band-pass filter to the adjacent pixel 165, Ps is the pitch in a prescribed direction of the pixels 16 of the photoelectric conversion element 17, U is the effective dimension in the prescribed direction of the pixels 16, and t is the dimension in the prescribed direction of the real image 132y' that the band-pass filter forms on a plurality of two-dimensionally arrayed pixels 163 and 164.

[Expression 9]

$$\sigma = Ps + \frac{Ps - u}{2} - \frac{t}{2} = \frac{3Ps - u - t}{2} \quad (8)$$

In the case in which there is an error in the pitch Pl in the prescribed direction between the microlenses ML, the cumulative value becomes greater going to the outermost periphery. Therefore, the allowable error in the pitch Pl becomes (3Ps−u−t)/Na, as σ must be divided by Na/2 where Na is the number of microlenses ML arrayed in the prescribed direction. The error in the pitch Pl furthermore must be considered as plus or minus. As a result, the pitch Pl in the prescribed direction between the microlenses ML is desirably designed so as to satisfy expression (9) below.

[Expression 10]

$$\left(1 - \frac{f}{L}\right)nPs - \frac{3Ps - u - t}{Na} \leq Pl \leq \left(1 - \frac{f}{L}\right)nPs + \frac{3Ps - u - t}{Na} \quad (9)$$

By satisfying expression (9), even in the case in which a shift has occurred in pitch alignment between the microlenses ML of the microlens array 15 and the pixels 16 of the photoelectric conversion element 17, there is no influence of that shift on measurement of spectral characteristics.

<Positional Alignment in X and Y Directions Between Microlens Array 15 and Photoelectric Conversion Element 17>

Figure 9:
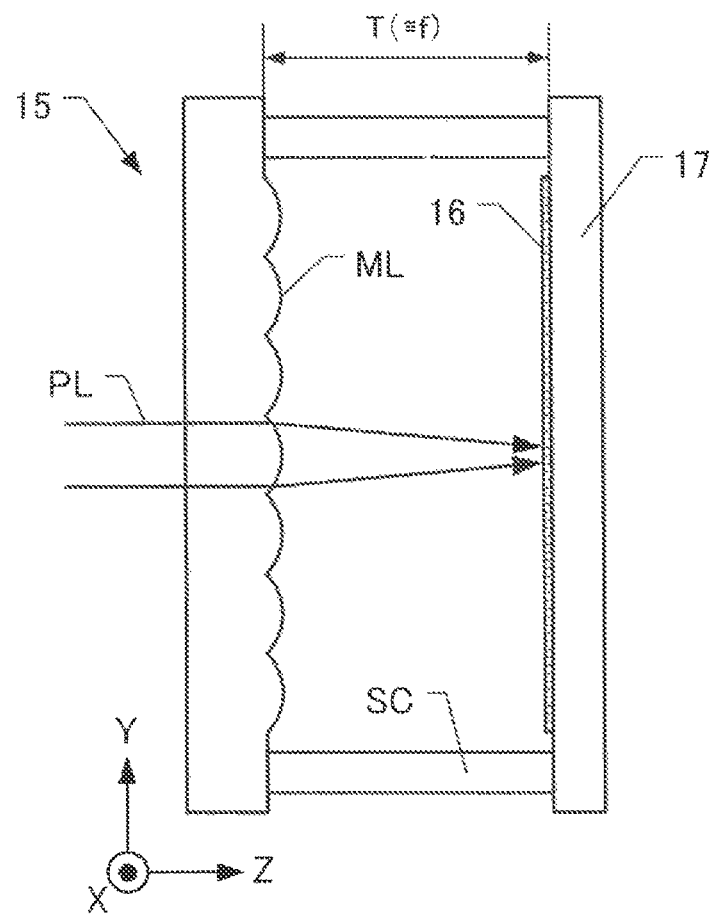
FIG. 9 is a diagram enlarging the microlens array 15 and the photoelectric conversion element 17.
Figure 11:
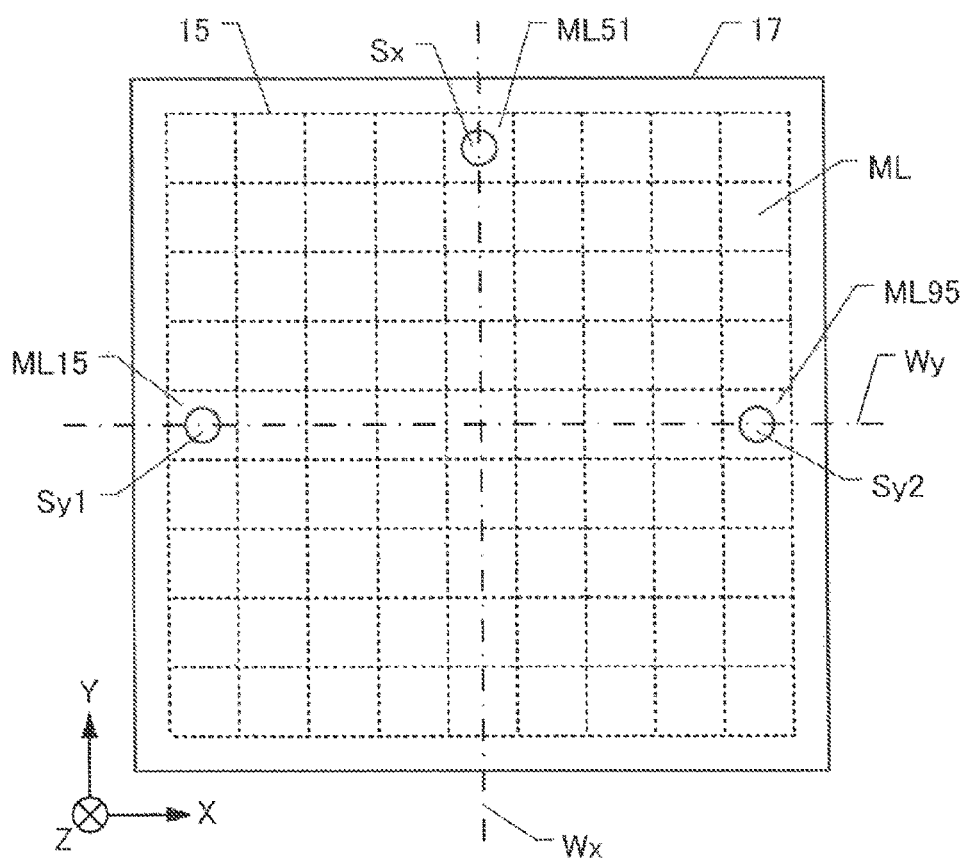
FIG. 11 illustrates rotational adjustment of pixels 16 of the photoelectric conversion element 17.

Positional alignment in the X and Y directions between the microlens array 15 and the photoelectric conversion element 17 is described below while referring to FIGS. 9 to 11. FIG. 9 is a diagram enlarging the microlens array 15 and the photoelectric conversion element 17. FIG. 10A illustrates positional alignment between the microlens array 15 and the photoelectric conversion element 17 in the case in which the number of pixels 16 in the Y axis direction relative to one microlens ML is odd. FIG. 10B illustrates positional alignment between the microlens array 15 and the photoelectric conversion element 17 in the case in which the number of pixels 16 in the Y axis direction relative to one microlens ML is even. FIG. 11 illustrates in-plane rotational adjustment of the pixels 16 of the photoelectric conversion element 17.

As illustrated in FIG. 9, spacers SC for determining the distance between the microlens array 15 and the photoelectric conversion element 17 are disposed between the microlens array 15 and the photoelectric conversion element 17. The distance T between the microlens array 15 and the photoelectric conversion element 17, that is, the thickness of the spacers SC, is a value obtained by expression (2).

In the case in which positional alignment in the Y axis direction is given as an example, lights PL perpendicular to the microlens array 15 and parallel to the center in the Y axis direction are projected. At this time, the relationship between the pixels of the photoelectric conversion element 17 and a spot SP formed on the pixels of the photoelectric conversion element 17 is illustrated in FIG. 10.

As illustrated in FIG. 10A, for example, in the case in which the number of pixels in the Y axis direction relative to the microlens ML in the center is odd (26a to 26c), positioning is performed relatively moving the photoelectric conversion element 17 against the microlens array 15 so that the output of the pixel 26b in the center of the odd number is maximized. That is, positioning is performed so that the spot SP is positioned on the pixel 26b.

As illustrated in FIG. 10B, for example, in the case in which the number of pixels in the Y axis direction relative to the microlens ML in the center is even (36a to 36d or 36e to 36h), positioning is performed relatively moving the photoelectric conversion element 17 against the microlens array 15 so that the output of one upper pixel 36b and one lower pixel 36c or pixel 36f and pixel 36g in the center of the even number balance. That is, positioning is performed so that the spot SP is positioned between the pixels 36b and 36c or between the pixels 36f and 36g.

Positioning in the Y axis direction between the microlens array 15 and the photoelectric conversion element 17 is described above, but positioning may be performed likewise also in the X axis direction. The description is given in FIG. 9 with an example of the case in which a light PL equal to the diameter of one microlens ML is projected on the microlens ML, but a light PL having a diameter larger than a plurality of microlenses ML also may be projected. In this case, only the signal obtained from the pixel 16 in the center of the photoelectric conversion element 17 should be detected.

<Rotational Adjustment Between Microlens Array 15 and Photoelectric Conversion Element 17>

Rotational adjustment (positioning) between the microlens array 15 and the photoelectric conversion element 17 is described while referring to FIG. 11. Here, rotational adjustment is performed simultaneously with positional alignment in the X and Y directions described with FIGS. 9 and 10.

As illustrated by the dotted line in FIG. 11, for example, the microlens array 15 is configured with 9×9=81 microlenses ML. In order to perform rotational adjustment between the microlens array 15 and the photoelectric conversion element 17, parallel lights PL as illustrated in FIG. 9 are projected on three microlenses ML of the microlens array 15. For example, a microlens ML 51 positioned on the center line in the X axis direction of the microlens array 15 and microlenses ML 15 and ML 95 positioned on the center line in the Y axis direction of the microlens array 15 are selected. Sx is the spot corresponding to the microlens ML 51, Sy1 is the spot corresponding to the microlens ML 15, and Sy2 is the spot corresponding to the microlens ML 95.

When performing rotational adjustment between the microlens array 15 and the photoelectric conversion element 17, the position of the photoelectric conversion element 17 is adjusted so that the spot Sx is positioned on the center line Wx in the X axis direction of the photoelectric conversion element 17 and the spots Sy1 and Sy2 are positioned on the center line Wy in the Y axis direction of the photoelectric conversion element 17. The center lines in the X and Y directions of the microlens array 15 and the center lines in the X and Y directions of the photoelectric conversion element 17 thereby overlap. That is, rotational adjustment between the microlens array 15 and the photoelectric conversion element 17 and positional alignment in the X and Y directions are performed simultaneously.

Here, because the position of the center line Wy in the Y axis direction of the photoelectric conversion element 17 is determined by the spots Sy1 and Sy2, the precision of rotational adjustment is improved when the spots Sy1 and Sy2 are at a great distance from each other. In FIG. 11, positioning in the X axis direction is performed in one place and positioning in the Y axis direction is performed in two places, but the same is achieved when positioning in the X axis direction is performed in two places and positioning in the Y axis direction is performed in one place.

<Reduction of Influence of Positional Alignment Error Between Microlens Array 15 and Photoelectric Conversion Element 17>

Figure 12:
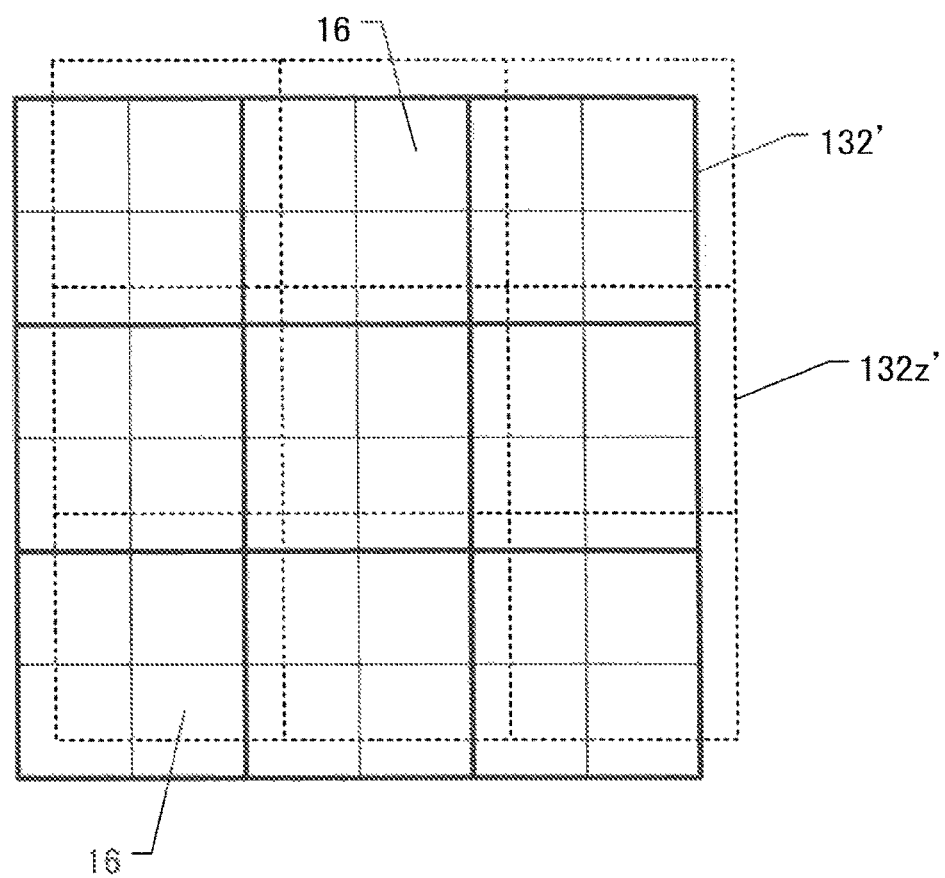
FIG. 12 illustrates positional shift of a real image 132' on the band-pass filter array 132.

Pitch alignment, positional alignment in the X and Y directions, and rotational adjustment related to the microlens array 15 and the photoelectric conversion element 17 are as described above. However, errors may occur in actual pitch alignment and positioning alignment in the X and Y directions. Reduction of the influence of errors in the case in which errors occur in positional alignment in the X and Y directions is described below while referring to FIGS. 12 and 13. FIG. 12 illustrates positional shift of a real image 132' on the band-pass filter array 132. FIG. 13A is a plan view of a band-pass filter array 232 having a light-blocking band 233, and B is a plan view of pixels 46 of a photoelectric conversion element having an insensitive band 47.

When pitch alignment, positional alignment in the X and Y directions, and rotational adjustment between the microlens array 15 and the photoelectric conversion element 17 are performed correctly, the real image 132' of the band-pass filter array 132 is formed in the position of the bold lines illustrated in FIG. 12. Here, the real images of each band-pass filter in the real image 132' are formed exactly on four pixels 16 as illustrated in FIG. 6B. However, when an error actually has occurred in positional alignment in the X and Y directions, the real image of the band-pass filter array 132 shifts from the regular position and an image 132z' is formed as illustrated by the dotted lines. Accordingly, interference between the band-pass filters 132a to 132i (see FIG. 2) arises, and there is a possibility that the spectral characteristics cannot be measured correctly.

In the case in which the image resolving performance of the microlens ML is poor, the real image 132 of the band-pass filter array 132 may spread due to loss of focus. Accordingly, interference between the band-pass filters 132a to 132i (see FIG. 2) arises, and the spectral characteristics cannot be measured correctly.

In response to such circumstances, a gap is desirably provided between real images of the band-pass filters 132a to 132i. For this purpose, a light-blocking band 233 for blocking light is preferably formed between the band-pass filters 132a to 132i as illustrated in FIG. 13A. By such configuration, light can be prevented from leaking from between the band-pass filters 132a to 132i and influencing the measurement of spectral characteristics.

Figure 13B:
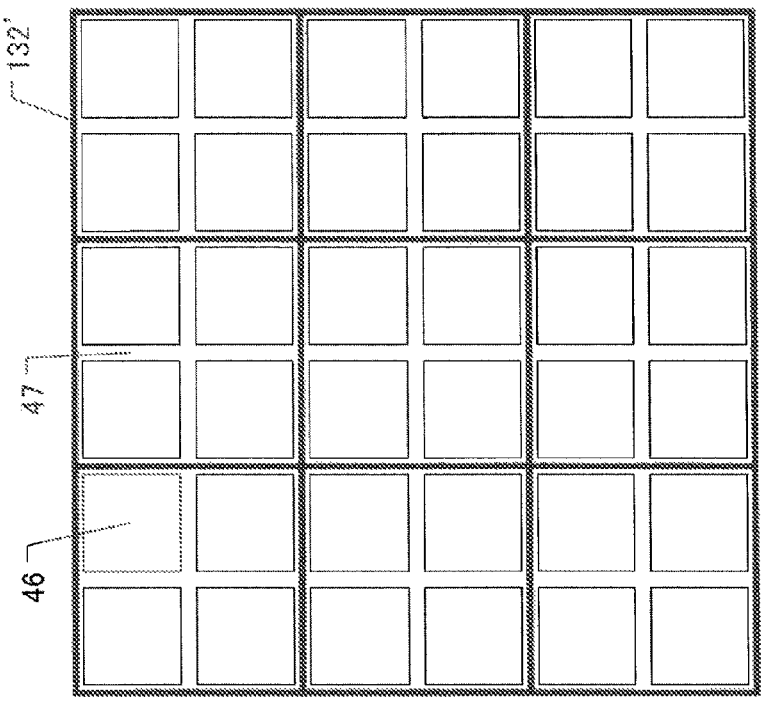
FIG. 13B is a plan view of pixels 46 of a photoelectric conversion element having an insensitive band 47.
Figure 13A:
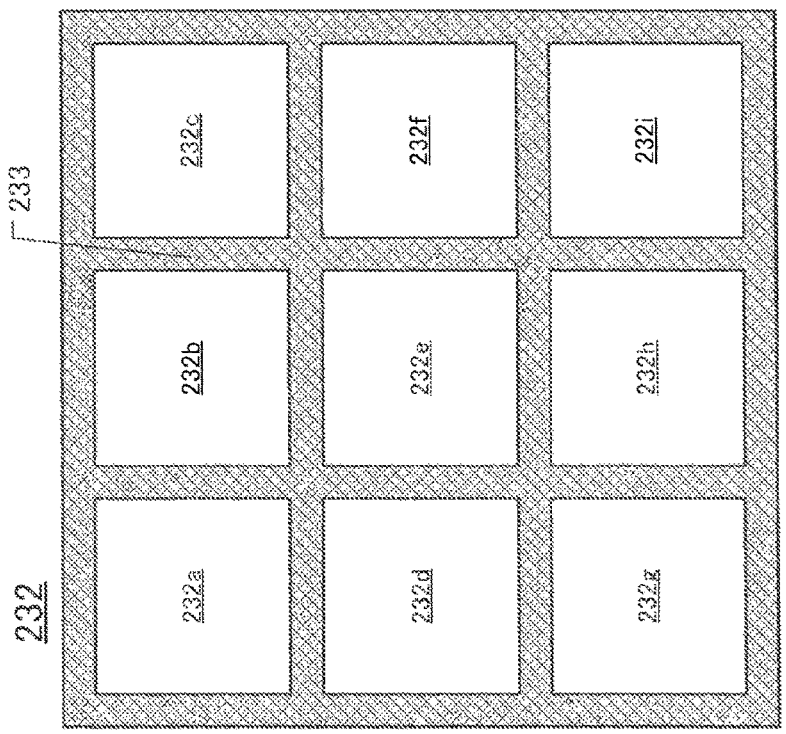
FIG. 13A is a plan view of a band-pass filter array 232 having a light-blocking band 233.

In response to such circumstances, an insensitive band 47 that does not output electrical signals even when light is incident between each pixel 46 of the photoelectric conversion element 17 is preferably formed as illustrated in FIG. 13B. By such configuration, even if the real image 132' of the band-pass filter array 132 loses focus, the unfocused portion (indicated by the bold line in the drawing) is positioned on the insensitive band 47 and does not influence the measurement of spectral characteristics. Reduction of errors in the case in which errors have occurred in positioning alignment in the X and Y directions is described above, but errors can be reduced by a method such as providing a light-blocking band or an insensitive band even in the case in which errors have occurred in relation to pitch alignment.

<Overall Configuration of the Multiband Camera 100>

Figure 14:
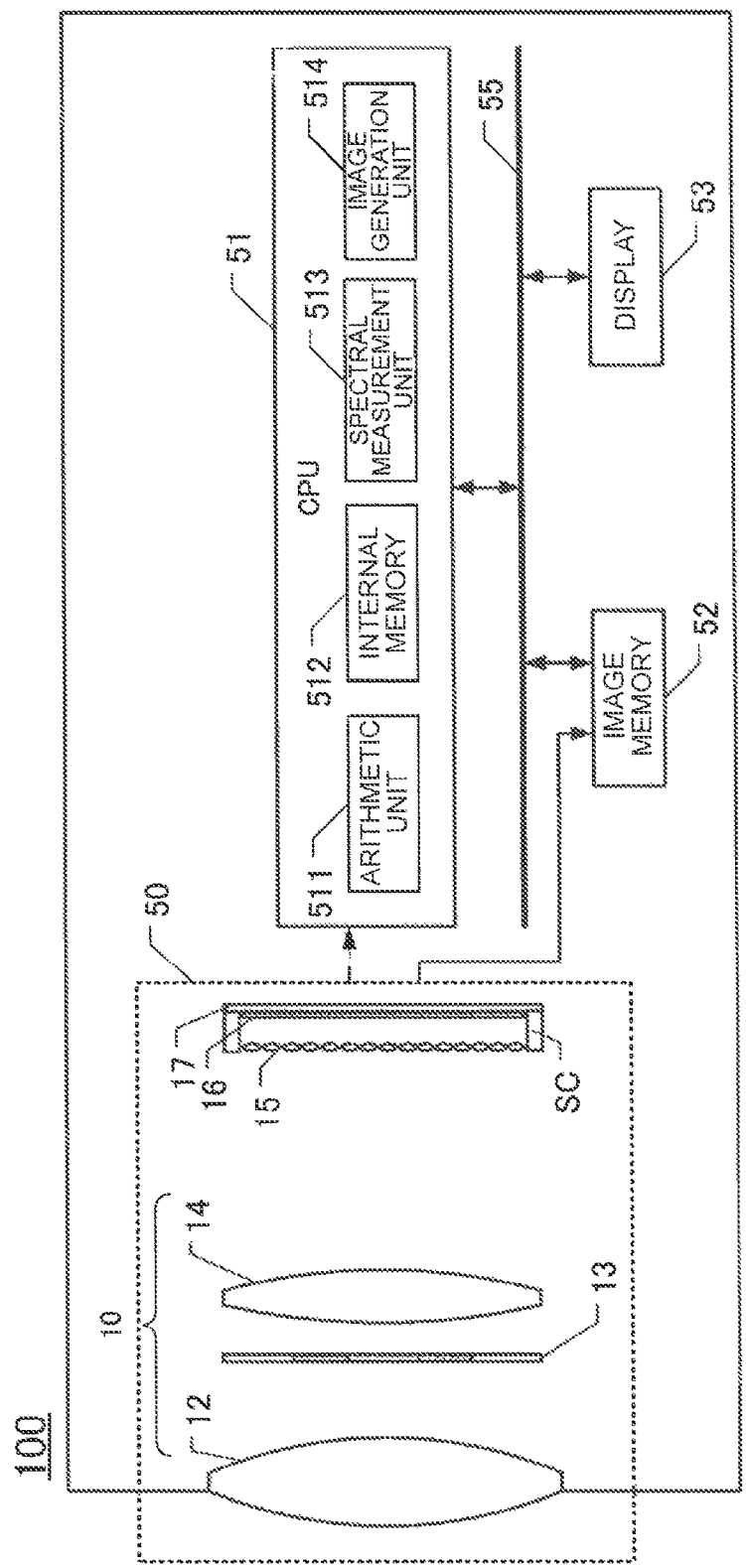
FIG. 14 is a schematic diagram illustrating the overall configuration of the multiband camera 100.

FIG. 14 is a schematic diagram illustrating the overall configuration of the multiband camera 100. As illustrated in FIG. 14, the multiband camera 100 comprises an image capturing unit 50 and a CPU (central processing unit) 51 for performing processing of data from the image capturing unit 50. The CPU 51 has a correction coefficient arithmetic unit 511, an internal memory 512, a spectral measurement unit 513, and an image generation unit 514.

The multiband camera 100 further comprises an image memory 52 for recording two-dimensional spectral images captured by the image capturing unit 50, and a display 53 as a display unit for displaying the two-dimensional spectral images recorded in the image memory 52.

In the multiband camera 100, the CPU 51, image memory 52, and display 53 are connected by way of a bus 55.

Adjustment of sensitivity of the band-pass filter unit 13 and the microlens array 15 is preferably performed when measuring spectral characteristics of each wavelength region using the multiband camera 100. This adjustment of sensitivity is performed using the correction coefficient arithmetic unit 511.

That is, the correction coefficient arithmetic unit 511 is used for obtaining a correction coefficient related to each wavelength region by capturing an image of a reference subject (not illustrated). At this time, for example, perfectly white paper having a clear spectral reflectivity and a white light source having a clear light emission spectrum are used for the reference subject.

The internal memory 512 is used for storing the correction coefficient obtained using the correction coefficient arithmetic unit 511. The internal memory 512 is preferably capable of reading and writing data.

The spectral measurement unit 513 is used for obtaining the wavelength characteristics of each wavelength region based on the image data of the subject 11 (see FIG. 1) captured by the image capturing unit 50 and the correction coefficients recorded in the internal memory 512. An intensity graph of each wavelength region is displayed to the display 53 as a display unit as illustrated in FIG. 15 based on the wavelength characteristics obtained using the spectral measurement unit 513.

Figure 15:
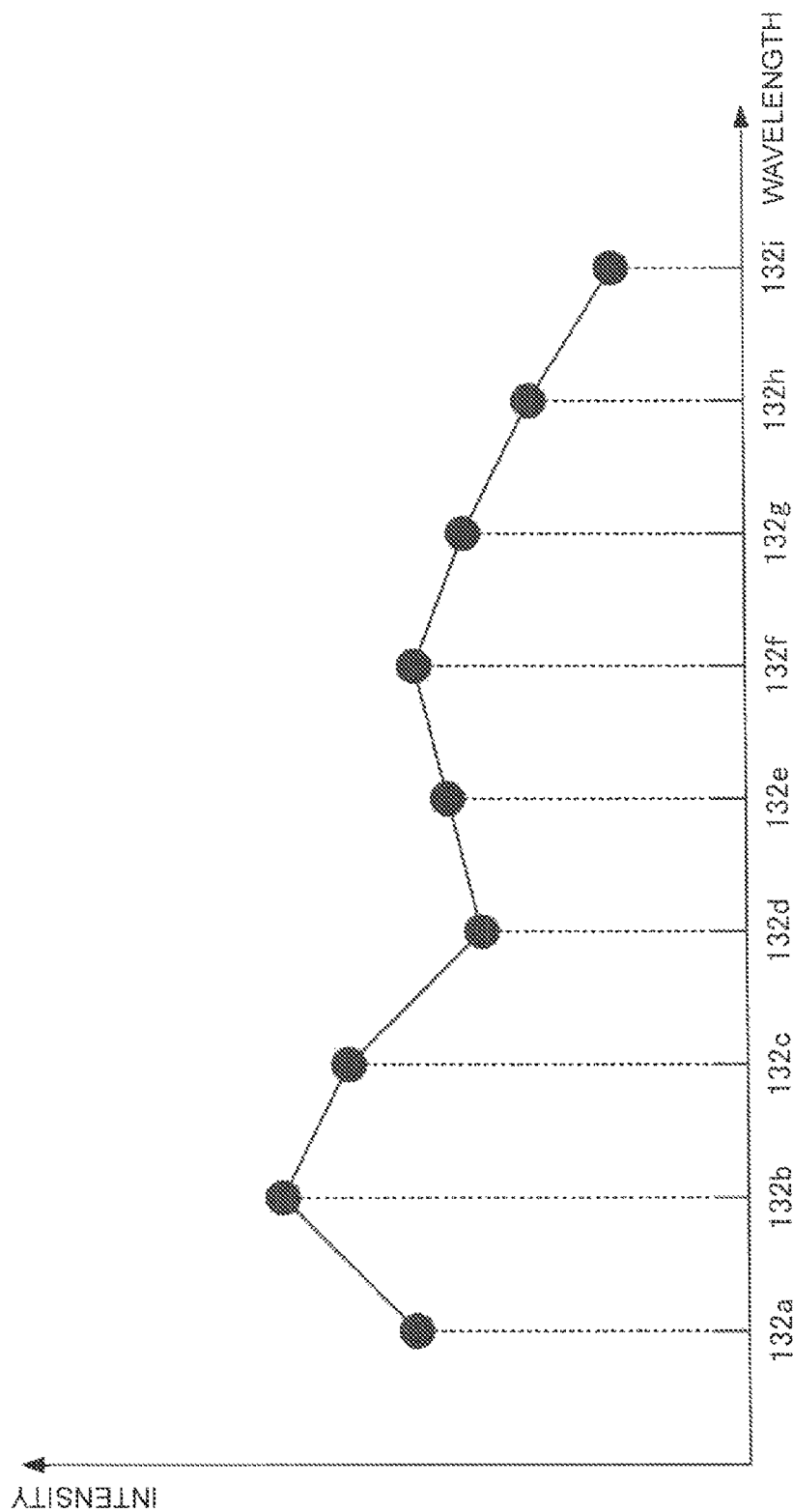
FIG. 15 is a graph illustrating the wavelength characteristics of a point P on a subject 11 obtained using the multiband camera 100.

FIG. 15 is a spectral intensity graph of one point on a subject 11 (see FIG. 1) captured using the multiband camera 100. Light coming from the point P on the subject 11 (see FIG. 1) is transmitted through the nine band-pass filters 132a to 132i of the band-pass filter array 132. The spectral intensity graph is a graph indicating the intensity of the light having those wavelength characteristics.

The image generation unit 514 is used for displaying the subject 11 to the display 53 as a display unit based on the image data of the subject 11 (see FIG. 1) captured using the i-age capturing unit 50. Let the display 53 have an RGB tricolor display element and the band-pass filter array 132 have nine band-pass filters. In this case, in the image generation unit 514, the image output of the real images 132a' to 132c' corresponds to R, the image output of the real images 132d' to 132f' corresponds to G, and the image output of the real images 132g' to 132i' corresponds to B.

<Multiband Picture Image Capturing Method Using the Multiband Camera 100>

Figure 16:
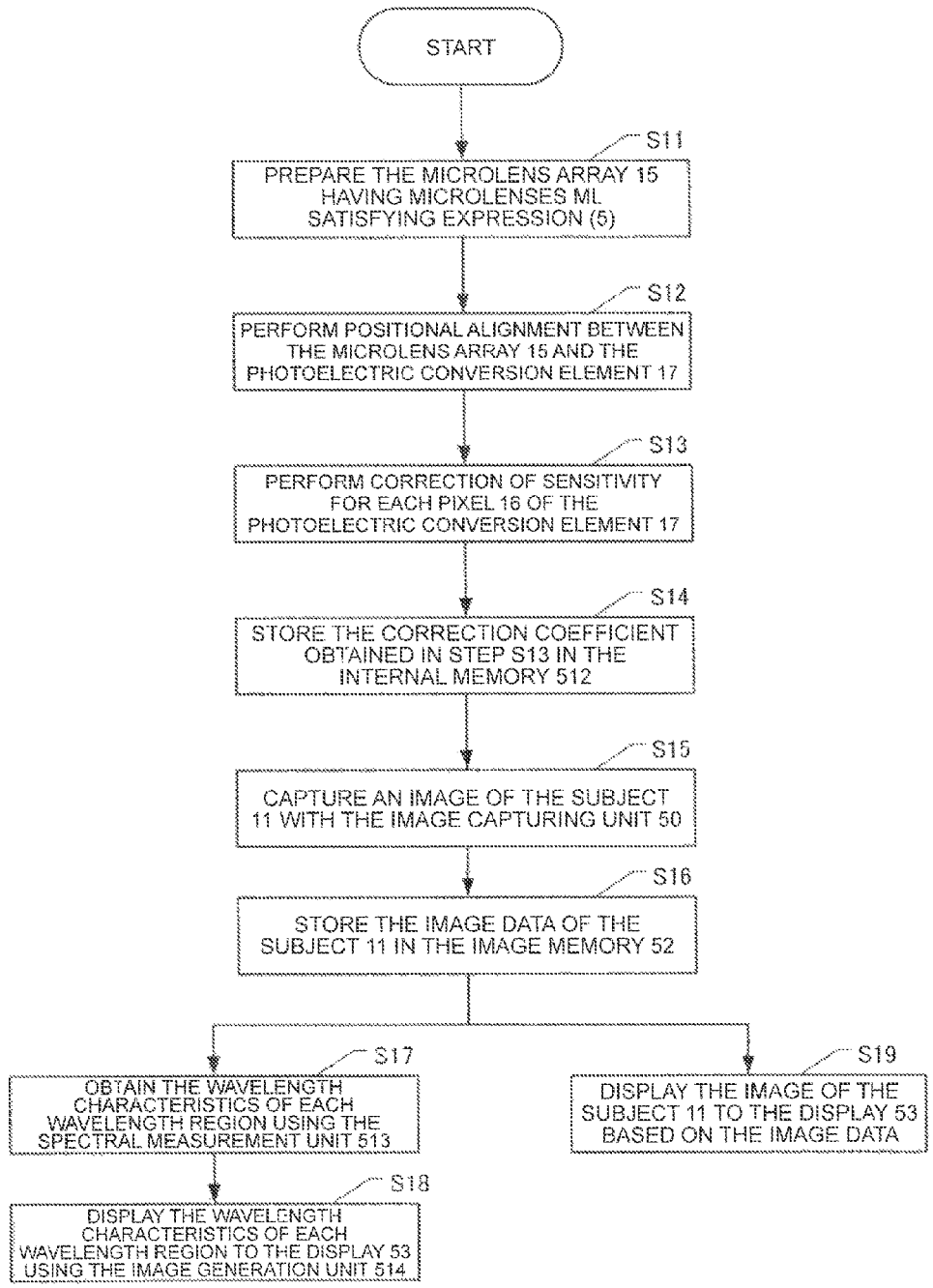
FIG. 16 is a flow chart illustrating the multiband image capturing method using the multiband camera 100.

The multiband image capturing method using the multiband camera 100 is described while referring to FIG. 16. FIG. 16 is a flow chart illustrating the multiband image capturing method using the multiband camera 100.

In step S11, a microlens array 15 containing microlenses ML satisfying expression (5) is prepared.

Figure 17:
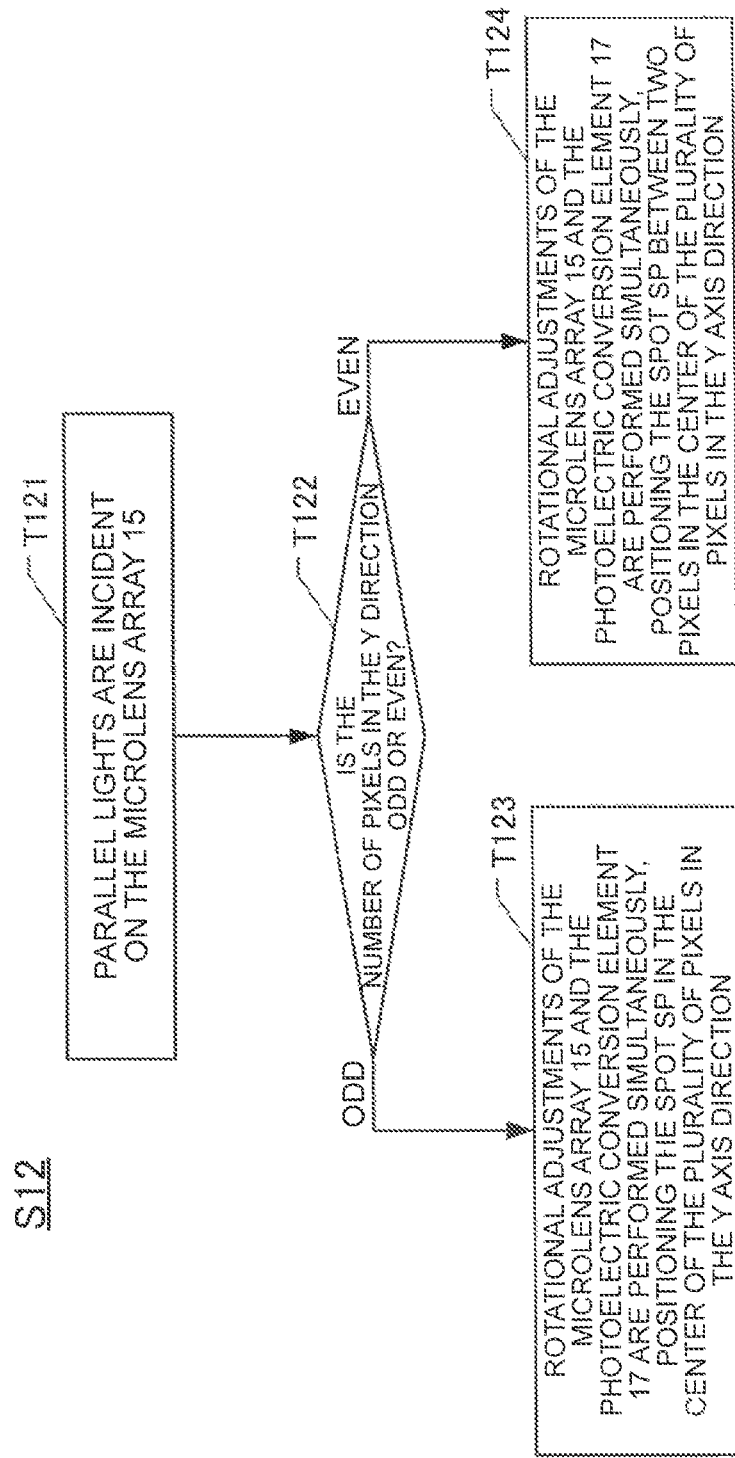
FIG. 17 is a flow chart for describing the step S13 for positional alignment between the microlens array 15 and the photoelectric conversion element 17.

In step S12, positional alignment between the microlens array 15 and the photoelectric conversion element 17 is performed. Step S12 is described while referring to FIGS. 9 to 11 and 17. FIG. 17 is a flow chart for describing the step S13 for positional alignment between the microlens array 15 and the photoelectric conversion element 17.

In step T121 illustrated in FIG. 17, lights PL being fluxes of light perpendicular to the microlens array 15 and nearly parallel are incident into the microlens array as illustrated in FIG. 9. A spot SP is then formed on a pixel of the photoelectric conversion element 17 corresponding to the microlens in the center as illustrated in FIG. 10.

In step T122, in the case in which the number of pixels in the Y axis (or X axis) direction corresponding to the microlens in the center is odd, based on the pitch relationship between the microlenses ML and the photoelectric conversion element 17 obtained in step S11, the flow advances to step T123. In the case in which the number of pixels in the Y axis direction corresponding to the microlens in the center is even, the flow advances to T124.

In step T123, for example, when the number of pixels in the Y axis (or X axis) direction corresponding to the microlens in the center is odd, the microlens array 15 and the photoelectric conversion element 17 are adjusted so that the spot SP is formed in the pixel in the center (see FIG. 10A). Adjustments of rotation in the X axis direction and Y axis direction between the microlens array 15 and the photoelectric conversion element 17 are performed simultaneously by detecting positional shifts in the center positions Sy1 and Sy2 in the Y axis direction and in the center position Sx in the X axis direction (see FIG. 11).

In step T124, for example, when the number of pixels in the Y axis (or X axis) direction corresponding to the microlens in the center is even, the microlens array 15 and the photoelectric conversion element 17 are adjusted so that the spot SP is formed between two pixels right in the center (see FIG. 10B). Adjustments of rotation in the X axis direction and Y axis direction between the microlens array 15 and the photoelectric conversion element 17 are performed simultaneously by detecting positional shifts in the center positions Sy1 and Sy2 in the Y axis direction and in the center position Sx in the X axis direction (see FIG. 11).

In steps T123 and T124, positioning in the X axis direction is performed in one place and positioning in the Y axis direction is performed in two places, but the same is achieved when positioning in the X axis direction is performed in two places and positioning in the Y axis direction is performed in one place.

Figure 18:
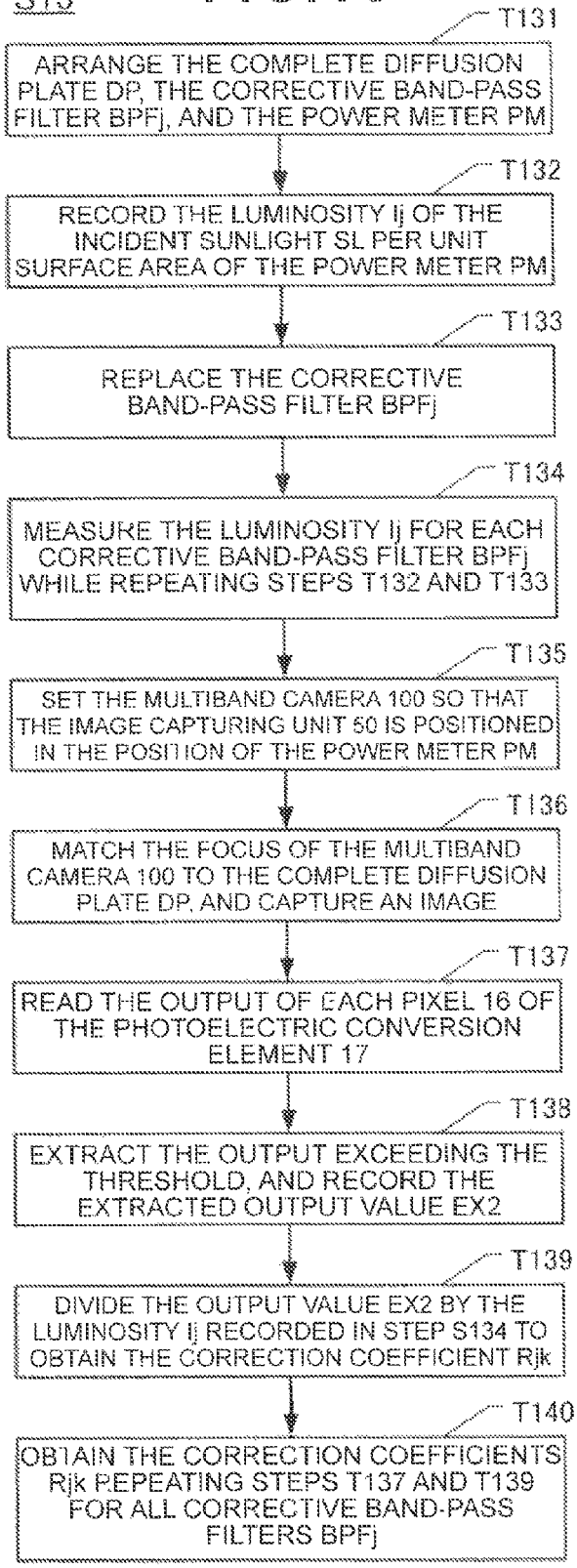
FIG. 18 is a flow chart for describing the step S13 for correction of sensitivity performed for each pixel 16 of the photoelectric conversion element 17.
Figure 19:
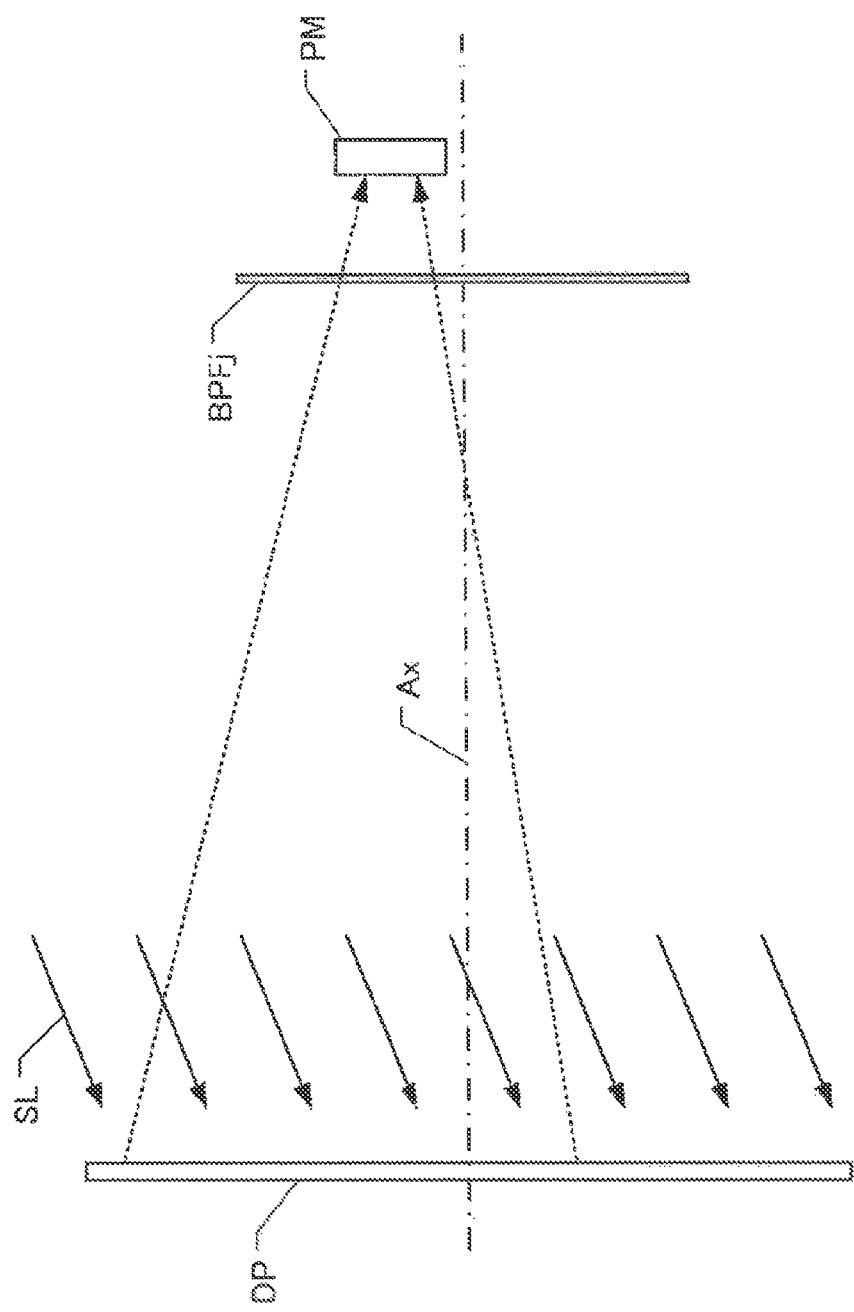
FIG. 19 is an explanatory diagram of the preparation step before obtaining the correction coefficient.
Figure 20:
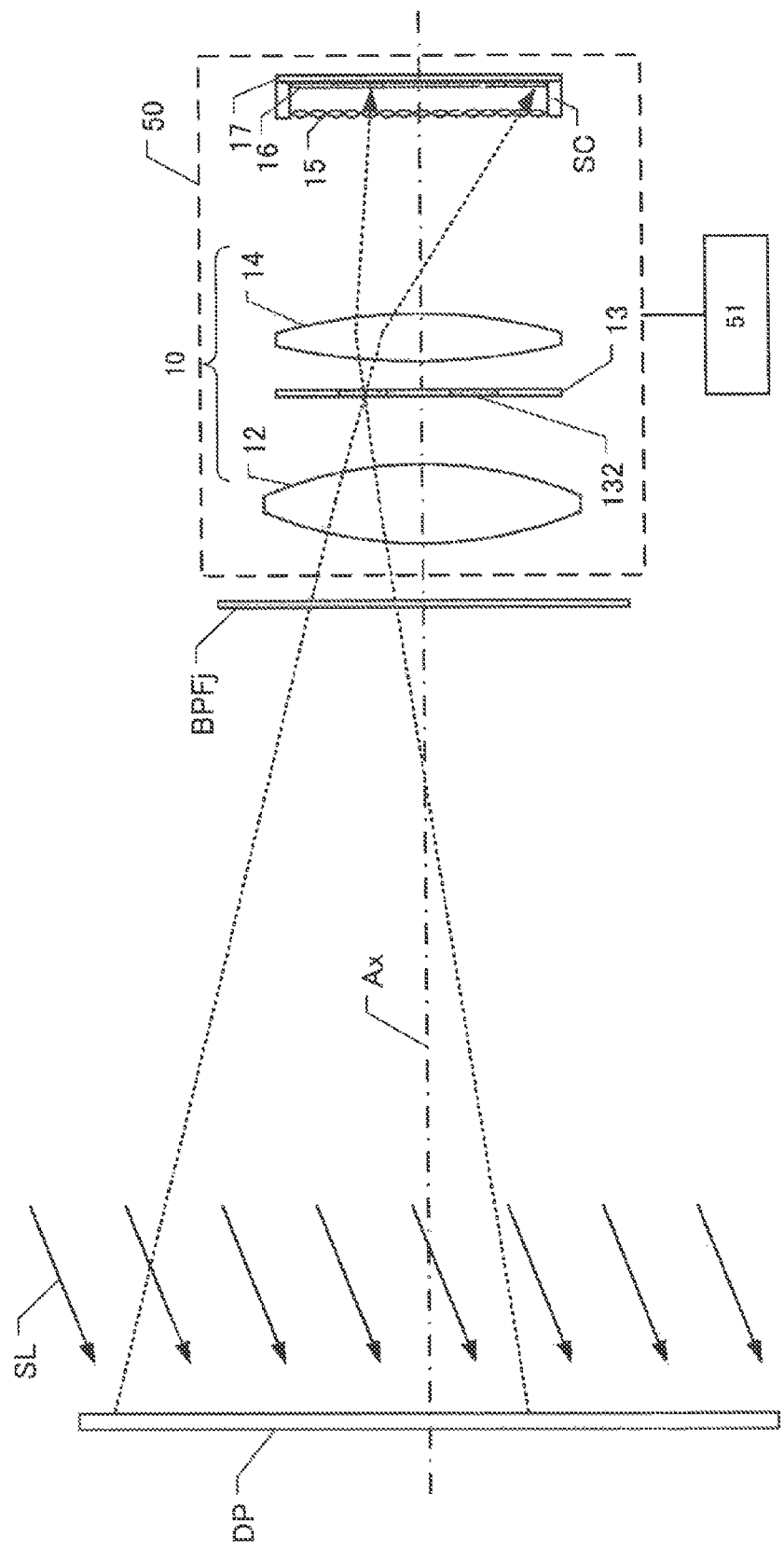
FIG. 20 is a diagram for describing how the correction coefficient is obtained.
Figure 21:
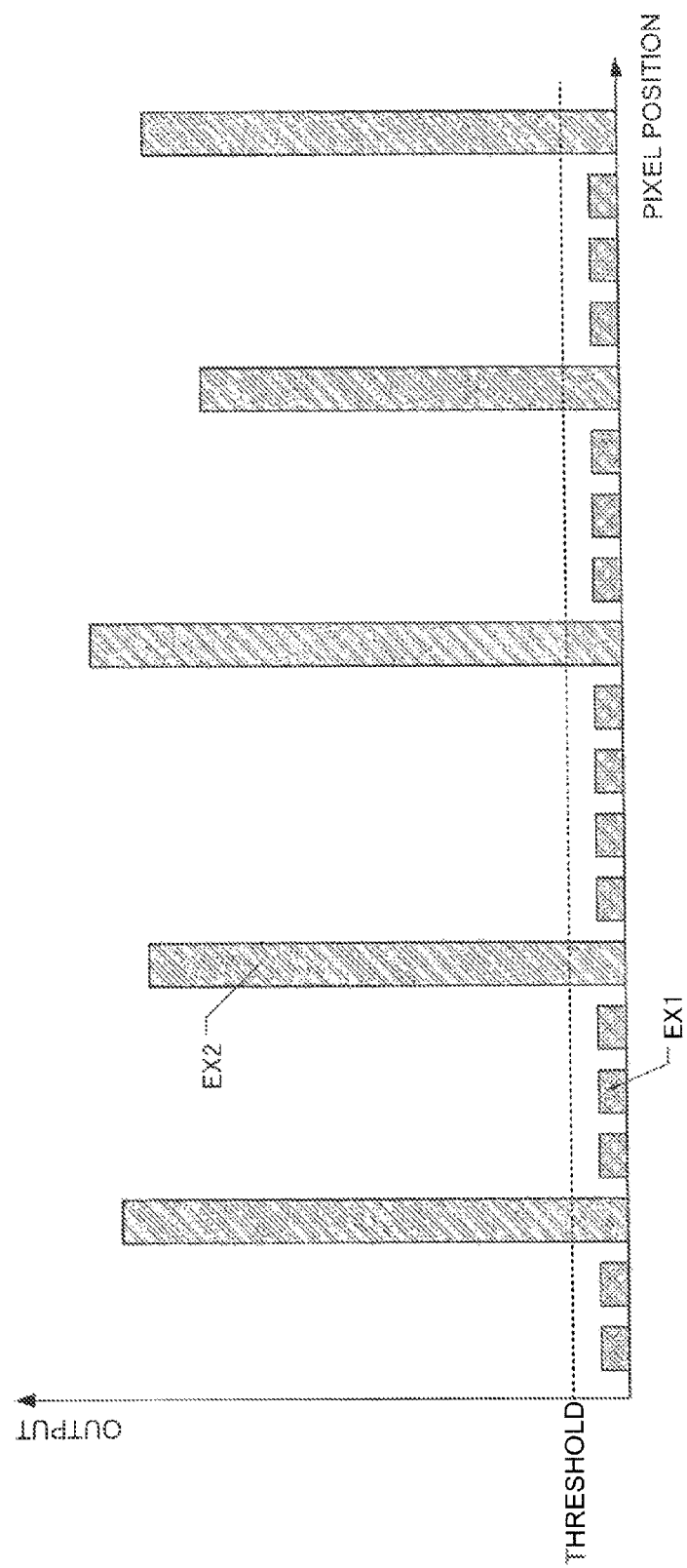
FIG. 21 is a graph illustrating the relationship between each pixel 16 and the outputs of corrective band-pass filters BPFj (1 to α)

Returning to the flow chart in FIG. 16, in step S13, correction of sensitivity is performed for each pixel 16 of the photoelectric conversion element 17. Step S13 is described while referring to FIGS. 18 to 21. FIG. 18 is a flow chart for describing the step S13 for correction of sensitivity performed for each pixel 16 of the photoelectric conversion element 17. FIG. 19 is an explanatory diagram of the preparation step before obtaining the correction coefficient, FIG. 20 is a diagram for describing how the correction coefficient is obtained, and FIG. 21 is a graph illustrating the relationship between each pixel 16 and the outputs of corrective band-pass filters BPFj (1 to $\alpha$).

In step T131 illustrated in FIG. 18, the complete diffusion plate DP, corrective band-pass filters BPFj, and power meter PM are arranged as illustrated in FIG. 19. Here, correction of sensitivity for each pixel 16 is performed after performing positioning alignment between the microlens array 15 and the photoelectric conversion element 17 as described in step S12 in FIG. 16. Ideally, correction is possible by calculation if the spectral transmissivity of each band-pass filter, the characteristics of the microlens array, the spectral sensitivity of the photoelectric conversion element, and the like, are known. However, the correction coefficient is desirably obtained experimentally because various errors may be included.

In order to obtain the correction coefficient experimentally, a light source that is capable of projecting light that is uniform within the angle of view of the imaging optical system 10, including the spectra of the wavelength regions of all of the band-pass filters, is preferably used. Therefore, sunlight SL is used as the light source in FIG. 19 and in FIG. 20 to be described. The corrective band-pass filter BPFj (j=1 to $\alpha$, $\alpha$ is the number of band-pass filters of the band-pass filter array) has spectral transmissivity characteristics equal to the characteristics of one band-pass filter within the band-pass filter array 132. The distance between the complete diffusion plate DP and the corrective band-pass filter BPFj is set to within a range such that the focus of the imaging optical system 10 matches from the complete diffusion plate DP (see FIG. 20).

In step T132, the power meter PM disposed behind the corrective band-pass filter BPFj records the luminosity Ij (1 to $\alpha$) per unit surface area of the sunlight SL reflected by the complete diffusion plate DP and transmitted through the corrective band-pass filter BPFj.

In step T133, the corrective band-pass filter BPFj is replaced. A corrective band-pass filter BPFj not used in step T132 among the $\alpha$ corrective band-pass filters BPFj is replaced.

In step T134, the luminosity Ij (1 to $\alpha$) is measured and recorded for each corrective band-pass filter BPFj while repeating steps T132 and T133.

In step T135, the multiband camera 100 is set so that the image capturing unit 50 is positioned in the position of the power meter 4 as illustrated in FIG. 20. Only the image capturing unit 50 and the CPU 51 are drawn for help in description in FIG. 20.

In step T136, the focus of the multiband camera 100 is matched to the complete diffusion plate DP.

In step T137, the output is read for each pixel 16 of the photoelectric conversion element 17.

In step T138, the output exceeding the threshold for the corrective band-pass filter BPFj is extracted. The threshold is preferably set to a low value because there will be a big difference between the output EX2 from the pixel 16 corresponding to the corrective band-pass filter BPFj and the output EX1 from another pixel 16 as illustrated in FIG. 21. The output value EX2 from the pixel 16 corresponding to the corrective band-pass filter BPFj is recorded in the CPU 51.

In step T139, the output value EX2 of the pixel 16 corresponding to the corrective band-pass filter BPFj extracted in step T138 is divided by the luminosity Ij recorded in step 134, and a correction coefficient Rjk (k=1 to $\beta$) is obtained. $\beta$ indicates the number of pixels 16 corresponding to the corrective band-pass filter BPFj, and is equal to or an integer multiple of the number of microlenses ML.

In step T140, steps T137 and T139 are repeated while replacing the corrective band-pass filters BPFj as described in step T133. All of the correction coefficients Rjk are thereby obtained.

Although sunlight SL is used as the illumination source for correction of sensitivity of the pixels 16 in FIGS. 19 and 20, illumination of a lamp may also be used. However, because irregularity of luminosity may arise on the diffusion plate in the case in which a lamp is used, the irregularity of luminosity is desirably measured separately in advance and corrected. However, if it is confirmed that the sensitivities among the pixels are in order, for simplicity, the output corresponding to one band-pass filter may be used as reference and relative sensitivity ratios of the outputs for the other band-pass filters may be used alone as corrective values.

Returning again to the flow chart in FIG. 16, in step S14, the correction coefficients corresponding to each wavelength region transmitted through each band-pass filter 132a to 132i obtained in step S13 are stored in the internal memory 512. If the correction coefficients are obtained at one time, then there will be no need to perform each step from S11 to S14 thereafter.

In step S15, the operator presses a release button (not illustrated), and an image of the subject 11 (see FIG. 1) is captured. The image data of the subject 11 is sent from the photoelectric conversion element 17 to the image memory 52.

In step S16, the image data of the subject 11 obtained in step S15 is stored in the image memory 52.

In step S17, the spectral measurement unit 513 is used for obtaining the wavelength characteristics of the fluxes of light of each wavelength region transmitted through each band-pass filter 132a to 132i, based on the correction coefficient obtained in step S13 and the image data of the subject 11 stored in step S16.

In the case illustrated in FIG. 6A, the wavelength characteristics of the fluxes of light of each wavelength region are obtained using the pixel 16 on which the real image of only one band-pass filter is formed from among the nine (3×3) pixels on which the real images 132a' to 132i' of the band-pass filters 132a to 132i respectively are formed. On the other hand, in the case illustrated in FIG. 6B, the wavelength characteristics of the fluxes of light of each wavelength region are obtained using at least one pixel 16 among four pixels 16 on which the real images 132a' to 132i' of the band-pass filters 132a to 132i respectively are formed.

In step S18, the wavelength characteristics obtained in step S17 are displayed to the display 53 in graph form by the image generation unit 514 (see FIG. 15).

In step S19, the image generation unit 514 displays the entire image of the subject 11 to the display 53 based on the image data of the subject 11 stored in the image memory 52. Steps S17 and S18 may be performed in parallel with step S19.

(Modification of Embodiment 1)

<Configuration of the Image Capturing Unit 50'>

Figure 22:
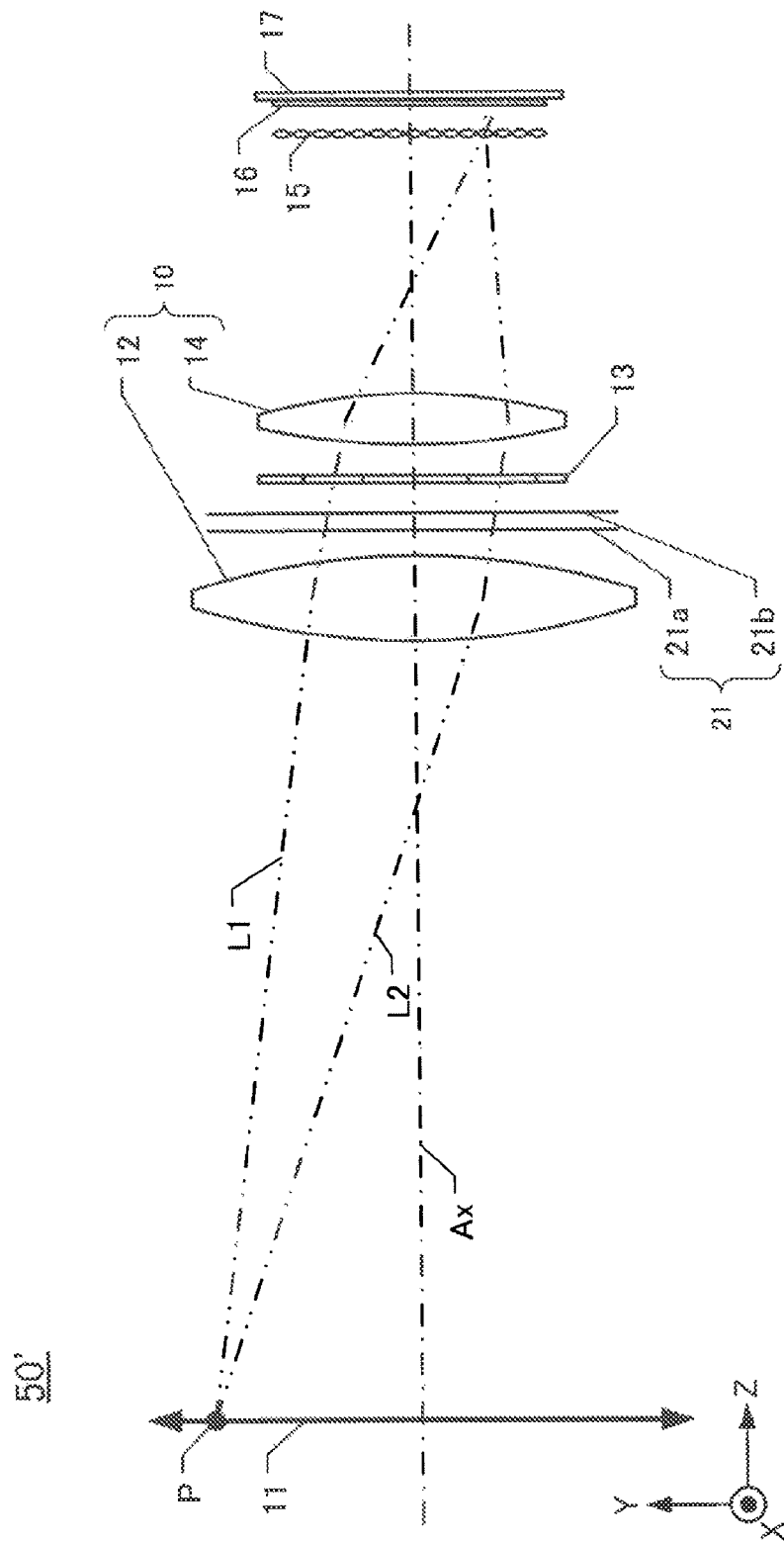
FIG. 22 is a schematic diagram of the image capturing unit 50' in a modification of Embodiment 1.
Figure 23:
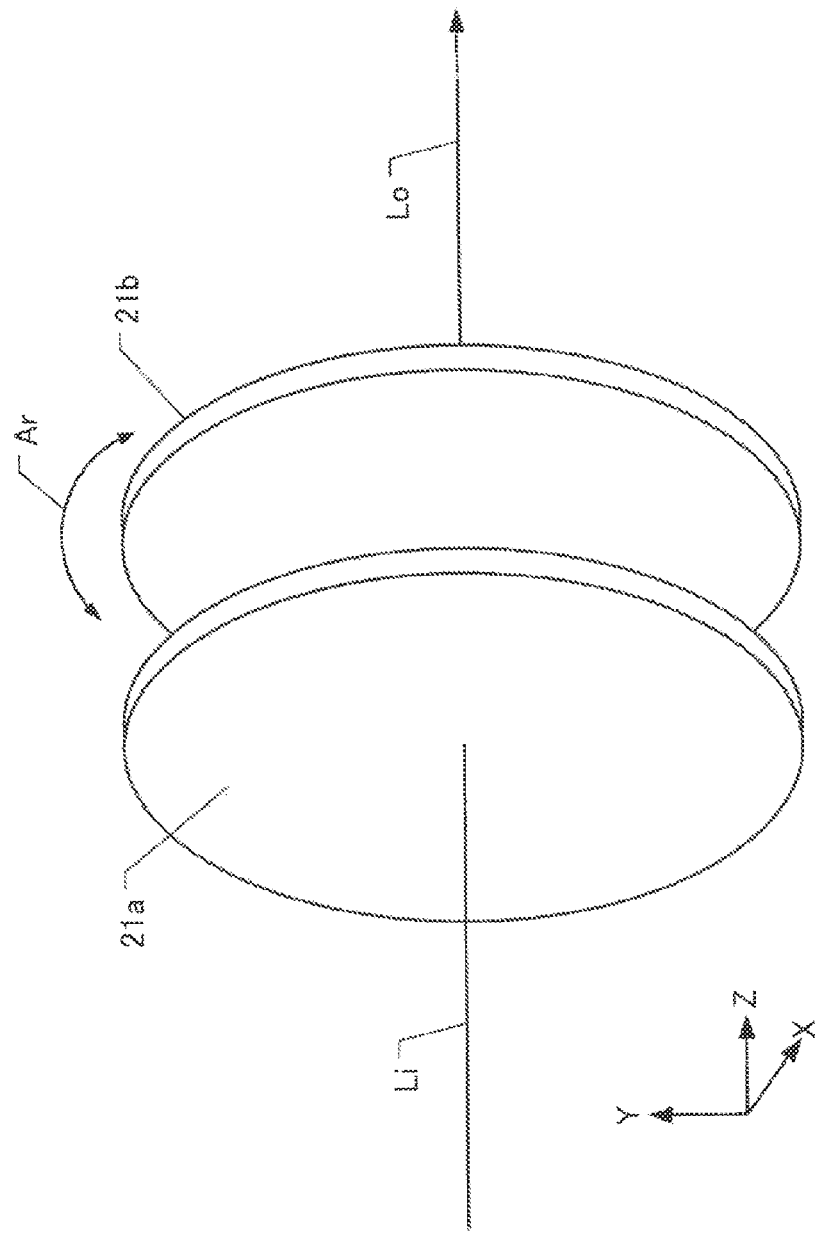
FIG. 23 is a perspective view illustrating the configuration of the luminosity adjustment unit 21.
Figure 24:
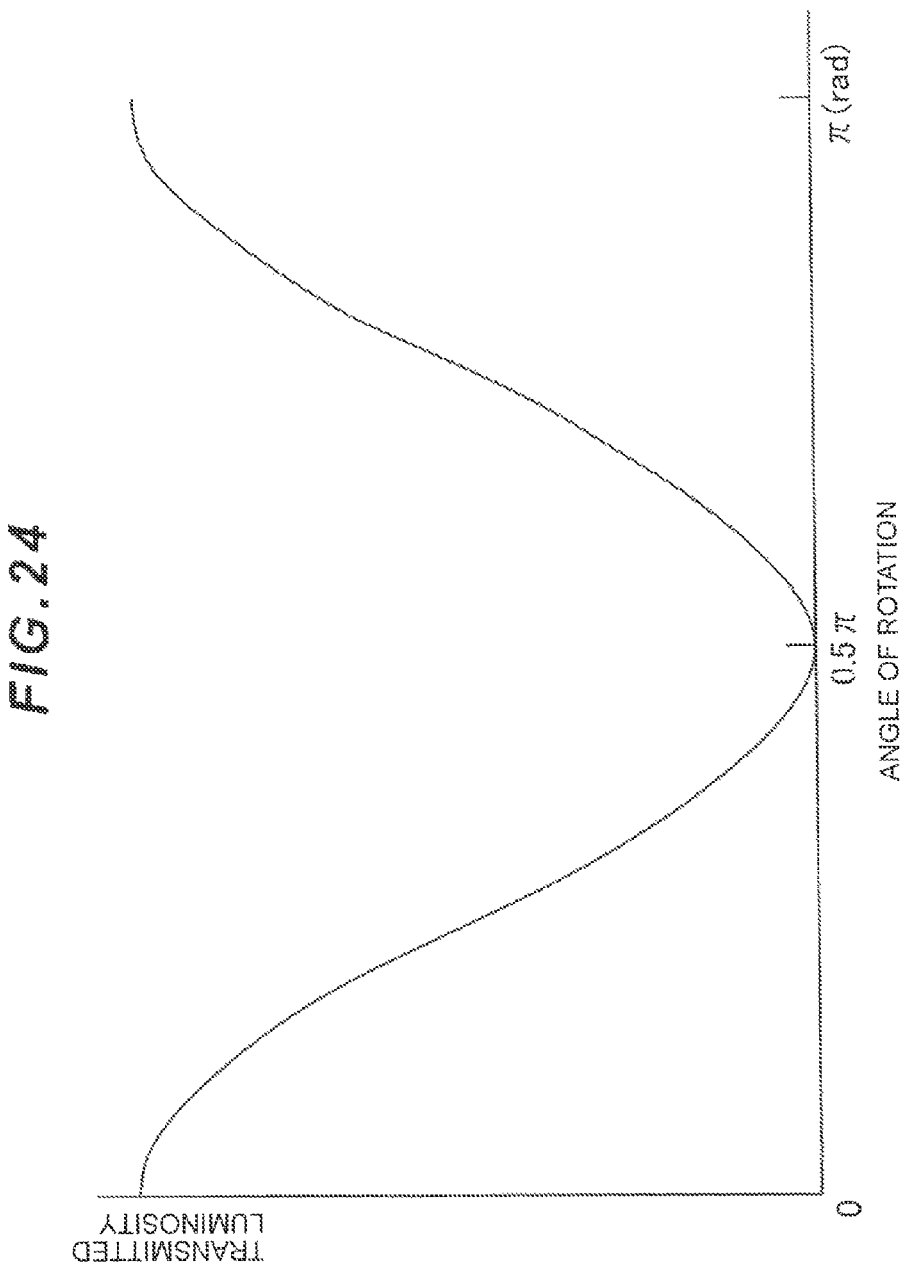
FIG. 24 is a graph illustrating the characteristics of the luminosity adjustment unit 21.

FIG. 22 is a schematic diagram of the image capturing unit 50' in a modification of Embodiment 1, FIG. 23 is a perspective view illustrating the configuration of the luminosity adjustment unit 21, and FIG. 24 is a graph illustrating the characteristics of the luminosity adjustment unit 21. As described above, the band-pass filter unit 13 is disposed in the position of the pupil of the imaging optical system 10. Therefore, it is difficult to dispose an aperture including aperture blades in the position of the pupil. Therefore, a luminosity adjustment unit 21 including a polarizer is disposed.

As illustrated in FIG. 22, the image capturing unit 50' has a luminosity adjustment unit 21 added to the image capturing unit 50 described in Embodiment 1. In the present embodiment, the luminosity adjustment unit 21 is disposed between the lens 12 and the band-pass filter unit 13 of the imaging optical system 10 so that its axis coincides with the optical axis Ax. However, the luminosity adjustment unit 21 may be disposed anywhere as long as it is in the space from the subject 11 to the photoelectric conversion element 17.

As illustrated in FIG. 23, the luminosity adjustment unit 21 is configured with a pair of polarizers 21a and 21b. The polarizer 21b is capable of rotating relatively with the polarizer 21a following the arrow Ar. Therefore, an incident light Li incident on the polarizer 21a becomes an exit light Lo exiting the polarizer 21b by rotation of the polarizer 21b. The luminosity of the exit light Lo is thereby changed in the sine wave form illustrated in FIG. 24.

In the modification of Embodiment 1, the polarizer 21b rotates relatively with the polarizer 21a. However, the same effect is obtained even when, conversely, the polarizer 21a rotates relatively with the polarizer 21b, and it is sufficient as long as there is relative rotation between the polarizer 21a and the polarizer 21b.

A wire grid having polarization characteristics with little dependence on wavelength or on angularity is preferably used for this polarizer.

Embodiment 2

<Configuration of the Image Capturing Unit 60>

Figure 25:
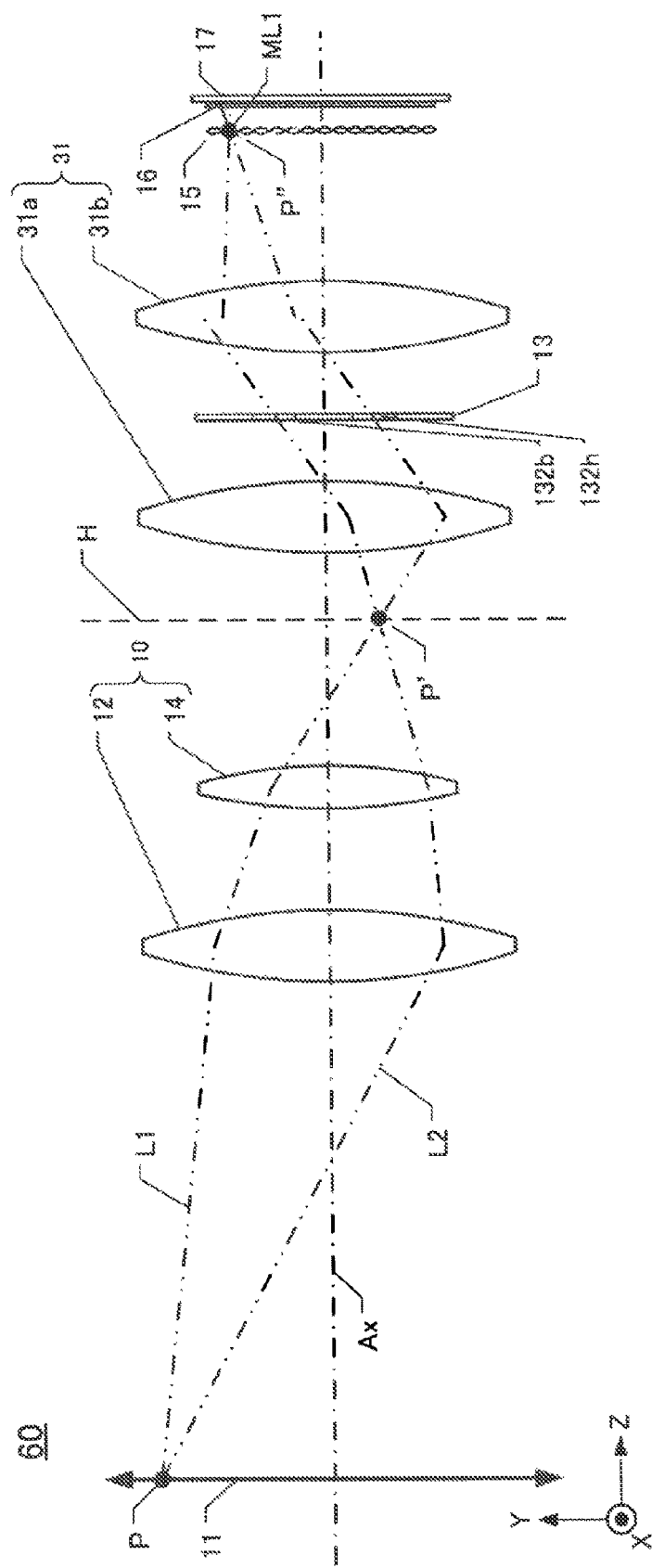
FIG. 25 is a schematic diagram of the image capturing unit 60 of Embodiment 2.

FIG. 25 is a schematic diagram of the image capturing unit 60 of Embodiment 2. In FIG. 25, the description is given with the same numerals being assigned to the same constituent elements as in Embodiment 1.

The image capturing unit 60 illustrated in FIG. 25 comprises an imaging optical system 10 configured with a lens 12 and a lens 14 disposed on the optical axis Ax, and a relay optical system 31 configured with a relay lens 31a and a relay lens 31b. A band-pass filter unit 13 (see FIG. 2) is disposed between the relay lens 31a and the relay lens 31b of the relay optical system 31. A microlens array 15 configured with a plurality of microlenses ML is disposed in a conjugate position with a subject 11. A photoelectric conversion element 17 configured with a plurality of pixels 16 is disposed toward the +Z side of the microlens array 15 and in a conjugate position with the band-pass filter unit 13.

With such configuration, the band-pass filter unit 13 is disposed inside the relay optical system 31. Therefore, the imaging optical system 10 can be replaced with another one having a different magnification factor. The imaging magnification of the multiband camera 100 can thereby be adjusted.

In Embodiment 2 as well, a luminosity adjustment unit 21 (see FIG. 23) configured with a pair of polarizers 21a and 21b may be added to the image capturing unit 60 as described in the modification of Embodiment 1.

<Optical Path in the Image Capturing Unit 60>

Fluxes of light L1 and L2 from one point P on the subject 11 is refracted by the lenses 12 and 14 of the imaging optical system 10 and a real image P' of the subject 11 is formed on the plane H depicted by the dotted lines. The fluxes of light L1 and L2 are incident on the relay optical system 31. The fluxes of light L1 and L2 refracted by the lens 31a of the relay optical system 31 are incident on the band-pass filter unit 13.

For example, the flux of light L1 is transmitted through the band-pass filter 132h (see FIG. 2) of the band-pass filter unit 13, and the flux of light L2 is transmitted through the band-pass filter 132b (see FIG. 2) of the band-pass filter unit 13. That is, only the light of the 670 nm to 710 nm wavelength region included in the flux of light L1 is transmitted through the band-pass filter unit 13. At the same time, the same time, only the light of the 430 nm to 470 nm wavelength region included in the flux of light L2 is transmitted through the band-pass filter unit 13.

The fluxes of light L1 and L2 transmitted through the band-pass filter unit 13 are refracted by the lens 31b of the relay optical system 31 and are incident on the microlens array 15. Here, because the microlens array 15 is disposed in a conjugate position with the subject 11 and the plane H, the real image P''' of the real image P' is formed on the microlens array 15. Therefore, the fluxes of light L1 and L2 from the one point P on the subject 11 are incident on the same microlens ML1 of the microlens array 15.

In Embodiment 2 as well, the pixels 16 of the photoelectric conversion element 17 are disposed in or proximal to a conjugate position with the band-pass filter. Because the focal length of the microlens ML1 is far shorter than the focal length of the lens 31b, the position conjugate with the band-pass filters 132b and 132h is in the neighborhood of the focal point of the microlens ML1 (see FIG. 5).

INDUSTRIAL UTILITY

Preferred embodiments of the present invention are described above, but it is obvious to persons skilled in the art that the present invention can be carried out making various modifications to the examples within the technical scope thereof.

For example, in the present invention, the CPU, image memory, LCD, and the like, are accessory to the multiband camera, but these may be provided in an external personal computer, or the like.

EXPLANATION OF NUMERALS AND CHARACTERS

10: Imaging optical system
11: Subject
12, 14: Lens
13: Band-pass filter unit
131: Light-blocking unit
132, 232: Band-pass filter array
132a to 132i, 232a to 232i: Band-pass filter
132': Real image on band-pass filter array
132a' to 132i': Real image on band-pass filter
132y': Real image on band-pass filter
15: Microlens array
16, 161, 162, 163, 164, 165, 16a to 16i, 16p to 16s, 26a to 26c, 36a to 36h, 46: Pixel of photoelectric conversion element
17: Photoelectric conversion element
21: Luminosity adjustment unit
21a, 21b: Polarizer
31: Relay optical system
31a, 31b: Lens
47: Insensitive band
50, 50', 60: Image capturing unit
51: CPU
511: Correction coefficient arithmetic unit
512: Internal memory
513: Spectral measurement unit
514: Image generation unit
52: Image memory
53: Display
55: Bus
100: Multiband camera
233: Light-blocking band Ax: Optical axis
BPFj: Corrective band-pass filter
DP: Complete diffusion plate
EX1, EX2: Output to each pixel
H: Image plane of subject from imaging optical system 10
ML, ML1: Microlens
P: Point on subject
P': Real image on one point P
P''': Real image on real image P'
PM: Power meter
SC: Spacer
SL: Sunlight
SP: Spot

The invention claimed is:

1. A multiband camera for capturing an image of an image capture wavelength region in mutually different wavelength bands divided into four or more bands when capturing an image of a subject, comprising:
  a band-pass filter that is disposed in a position of a pupil of an optical system and has four or more optical filters for respectively transmitting the wavelength bands divided into four or more bands;
  a microlens array having two-dimensionally arrayed positive microlenses;
  a photoelectric conversion element that is disposed in the vicinity of a focal point of the microlens array and is disposed in or proximal to a conjugate position with the band-pass filter, and includes a plurality of two-dimensionally arrayed pixels on which is incident a flux of light transmitted through the band-pass filter and guided by the microlens array; and
  a measurement unit for measuring a spectral intensity of the flux of light from the subject based on a signal output from the pixels corresponding to the optical filters;
  wherein: the expression below is satisfied; where Pl is a pitch in a prescribed direction between the microlenses of the microlens array; Ps is a pitch in the prescribed direction between the pixels of the photoelectric conversion element; n is a number of pixels in the prescribed direction corresponding to one of the microlenses; u is an effective dimension in a prescribed direction of the pixels; t is a dimension in a prescribed direction of a real image of the band-pass filter formed on the plurality of two-dimensionally arrayed pixels; Na is a number of microlenses arrayed in a prescribed direction; L is a distance from an exit pupil corresponding to the pupil to the microlens; and f ($\ll$L) is a focal length of the microlens, $$\left(1-\frac{f}{L}\right)nPs - \frac{3Ps-u-t}{Na} \leq$$ [Expression 11]

$$Pl \leq \left(1-\frac{f}{L}\right)nPs + \frac{3Ps-u-t}{Na}.$$

2. The multiband camera according to claim 1, wherein a real image of the subject is formed on the microlens.

3. The multiband camera according to claim 1, wherein:
  the pixels are rectangular; and
  each of the optical filters of the band-pass filter also is rectangular, and the optical filters are disposed in an array adjacently without any light-blocking region to block light.

4. The multiband camera according to claim 1, wherein:
the pixels are rectangular;
each of the optical filters of the band-pass filter also is rectangular; and
the band-pass filter is disposed in an array with a light-blocking region for blocking light interposed between adjacent filters.

5. The multiband camera according to claim 1, wherein the photoelectric conversion element has an insensitive band that does not output an electrical signal even when a flux of light is incident between adjacent pixels.

6. The multiband camera according to claim 1, wherein the number of pixels of the photoelectric conversion element corresponding to one of the microlenses is an integer multiple of the number of the optical filters.

7. The multiband camera according to claim 1, wherein a spacer having a thickness T satisfying the expression below is disposed between the microlens array and the photoelectric conversion element, $$T = \frac{Lf}{L-f} \cong f.$$ [Expression 12]

8. The multiband camera according to claim 1, further comprising a display unit for displaying the subject based on the signal output from the photoelectric conversion element.

9. The multiband camera according to claim 1, further comprising:
a pair of polarizers that are disposed on an optical axis connecting the subject and the photoelectric conversion element; wherein:
at least one polarizer of the pair of polarizers is relatively rotatable around the optical axis.

10. The multiband camera according to claim 1, wherein adjustment is made so that the real image of the subject is formed on the microlens by moving only the lens closer to the subject relative to the pupil among the lenses constituting the optical system in the direction of the optical axis connecting the subject and the photoelectric conversion element.

11. The multiband camera according to claim 1, wherein the optical system includes an imaging optical system for forming a first real image of the subject or a relay optical system for forming a second real image from the first real image of the imaging optical system.

12. The multiband camera according to claim 11, wherein the band-pass filter is disposed in the relay optical system.

13. A multiband image capturing method for capturing an image of a subject with a photoelectric conversion element comprising two-dimensionally arrayed pixels by way of a band-pass filter being disposed in a position of a pupil of an optical system and having optical filters corresponding to wavelength bands divided into four or more bands and by way of a microlens array for guiding a flux of light transmitted through the band-pass filter, comprising:
a measurement step for measuring a spectral intensity of each of the divided wavelength bands based on a signal output upon image capturing being performed in the image capturing step, $$\left(1-\frac{f}{L}\right)nPs - \frac{3Ps-u-t}{Na} \leq$$
$$Pl \leq \left(1-\frac{f}{L}\right)nPs + \frac{3Ps-u-t}{Na}$$ [Expression 13]

where Pl indicates a pitch in a prescribed direction between the microlenses of the microlens array; Ps indicates a pitch in the prescribed direction between the pixels of the photoelectric conversion element; n indicates a number of pixels in the prescribed direction corresponding to one of the microlenses; u indicates an effective dimension in a prescribed direction of the pixels; t indicates a dimension in a prescribed direction of a real image of the band-pass filter formed on the plurality of two-dimensionally arrayed pixels; Na indicates a number of microlenses arrayed in a prescribed direction; L indicates a distance from an exit pupil corresponding to the pupil to the microlens; and f indicates a focal length of the microlens.

14. The multiband image capturing method according to claim 13, further comprising, after the preparation step and before the sensitivity correction step:
a positional alignment step for performing positional alignment within the photoelectric conversion element plane between the microlens array and the photoelectric conversion element, so that a spot formed on the photoelectric conversion element by parallel light rays incident on a microlens positioned in the center of the microlens array in the prescribed direction is positioned in the center in the prescribed direction of the plurality of pixels of the photoelectric conversion element corresponding to the microlens positioned in the center of the microlens array in the prescribed direction.

15. The multiband image capturing method according to claim 13, further comprising a display step for displaying on a display unit the image of the subject or a spectrum of each portion of the image based on the signal output upon image capturing being performed in the image capturing step.

* * * * *